US010448433B2

(12) United States Patent
Zu et al.

(10) Patent No.: US 10,448,433 B2
(45) Date of Patent: Oct. 15, 2019

(54) DATA PROCESSING METHOD, APPARATUS, TERMINAL, MOBILITY MANAGEMENT ENTITY, AND SYSTEM

(71) Applicant: HUAWEI TECHNOLOGIES CO., LTD., Shenzhen, Guangdong (CN)

(72) Inventors: Shengze Zu, Shanghai (CN); Xiaobo Wu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/499,326

(22) Filed: Apr. 27, 2017

(65) Prior Publication Data

US 2017/0230819 A1    Aug. 10, 2017

Related U.S. Application Data

(63) Continuation of application No. PCT/CN2014/090112, filed on Oct. 31, 2014.

(51) Int. Cl.
*H04W 76/10* (2018.01)
*H04W 76/30* (2018.01)
*H04W 8/08* (2009.01)

(52) U.S. Cl.
CPC ........... *H04W 76/10* (2018.02); *H04W 8/085* (2013.01); *H04W 76/30* (2018.02)

(58) Field of Classification Search
CPC .................................. H04W 4/00; H04W 4/02
See application file for complete search history.

(56) References Cited

U.S. PATENT DOCUMENTS 8,989,124 B1 * 3/2015 Ramamurthy ...... H04W 76/022
370/329
9,913,125 B1 * 3/2018 Chen .................... H04W 76/10
(Continued)

FOREIGN PATENT DOCUMENTS

CN    101115056 A    1/2008
CN    101370300 A    2/2009
(Continued)

OTHER PUBLICATIONS

International Search Report dated Aug. 14, 2015 in corresponding to International Application PCT/CN2014/090112.
(Continued)

*Primary Examiner* — San Htun
(74) *Attorney, Agent, or Firm* — Womble Bond Dickinson (US) LLP

(57) ABSTRACT

Embodiments of the present invention relate to the field of communications technologies and disclose a data processing method, apparatus, terminal, mobility management entity, and system, so as to reduce data transmission resources and avoid bringing an economic loss to a user. The method in the present invention includes: detecting a status of a data switch of a terminal, where the status includes a disabled state or an enabled state; and sending, by the terminal, a public data network PDN disconnection request to a mobility management entity MME after the status of the data switch is changed from the enabled state to the disabled state, where the PDN disconnection request carries information about a data bearer corresponding to a data domain access point name APN, and the PDN disconnection request is used to trigger the MME to delete the data bearer corresponding to the APN.

13 Claims, 8 Drawing Sheets

(56) References Cited

U.S. PATENT DOCUMENTS

| | | | |
|---|---|---|---|
| 2009/0093232 A1 | 4/2009 | Gupta et al. | |
| 2009/0270098 A1* | 10/2009 | Gallagher | H04W 8/08 455/435.1 |
| 2010/0195493 A1* | 8/2010 | Hedman | H04W 76/10 370/230 |
| 2011/0274045 A1 | 11/2011 | Wu | |
| 2012/0202491 A1* | 8/2012 | Fox | H04B 7/2609 455/435.1 |
| 2012/0269167 A1 | 10/2012 | Velev et al. | |
| 2014/0254483 A1* | 9/2014 | Zisimopoulos | H04L 47/266 370/328 |
| 2015/0065125 A1* | 3/2015 | Patel | H04W 8/12 455/433 |

FOREIGN PATENT DOCUMENTS

| | | |
|---|---|---|
| CN | 101483932 A | 7/2009 |
| CN | 101500340 A | 8/2009 |
| CN | 102238085 A | 11/2011 |
| KR | 10-2004-0073144 | 8/2004 |
| RU | 2459374 C2 | 8/2012 |
| WO | 2010/069403 A1 | 6/2010 |
| WO | 2014112609 A1 | 7/2014 |

OTHER PUBLICATIONS

Chinese Search Report dated Nov. 10, 2016 in corresponding Chinese Patent Application 201480013816.6.
International Search Report, dated Aug. 14, 2015, in International Application No. PCT/CN2014/090112 (6 pp.).
S2-134032 Ericsson,"Solution of restricting the USIM to specific UEs",SA WG2 Meeting #100,Nov. 11-15, 2013, San Francisco, USA,total 15 pages.
Japanese Office Action dated May 22, 2018 in related Japanese Patent Application No. 2017-523238 (3 pages) (3 pages English Translation).
Russian Notice of Allowance dated Jun. 22, 2018 in related Russian Patent Application No. 2017118539 (27 pages).

\* cited by examiner

DATA PROCESSING METHOD, APPARATUS, TERMINAL, MOBILITY MANAGEMENT ENTITY, AND SYSTEM

CROSS-REFERENCE TO RELATED APPLICATIONS

This application is a continuation of International Application No. PCT/CN2014/090112, filed on Oct. 31, 2014, the disclosure of which is hereby incorporated by reference in its entirety.

TECHNICAL FIELD

The present disclosure relates to the field of communications technologies, and in particular, to a data processing method, apparatus, terminal, mobility management entity, and system.

BACKGROUND

In an LTE (Long Term Evolution) network, more data services are used by a user by using a terminal. Sometimes, the user expects to control data transmission between the terminal and the network. To satisfy a requirement that the user can control the data transmission between the terminal and the network, data switches are configured on many terminals. In the LTE network, after a data traffic switch is disabled or after a data traffic switch or an international roaming data switch is disabled in an international roaming scenario, the terminal cannot send any data to the network.

The prior art has at least the following problems: After a data traffic switch or a roaming data switch is disabled, a terminal controls the terminal not to send any data to a network anymore. However, a network device continues to deliver a downlink data packet to the terminal, and the terminal can receive the data packet. Consequently, the terminal receives the data packet that does not need to be received, and a corresponding charge is calculated, which not only wastes data transmission resources but also brings an economic loss to a user.

SUMMARY

Embodiments of the present invention provide a data processing method, apparatus, terminal, mobility management entity, and system, so as to reduce data transmission resources and avoid bringing an economic loss to a user.

To achieve the foregoing objective, the following technical solutions are used in the embodiments of the present invention.

According to a first aspect, an embodiment of the present invention provides a data processing method, including:

detecting, by a terminal, a status of a data switch, where the status includes a disabled state or an enabled state; and sending, by the terminal, a public data network PDN disconnection request to a mobility management entity MME after the status of the data switch is changed from the enabled state to the disabled state, where the PDN disconnection request carries information about a data bearer corresponding to a data domain access point name APN, and the PDN disconnection request is used to trigger the MME to delete the data bearer corresponding to the APN.

With reference to the first aspect, in a first possible implementation manner of the first aspect, after the sending a public data network PDN disconnection request to a mobility management entity MME, the method further includes:

sending a PDN connection request to the MME after the status of the data switch is changed from the disabled state to the enabled state, where the PDN connection request carries a data-type APN, so that the MME establishes a data bearer according to the data-type APN.

With reference to the first aspect or the first possible implementation manner of the first aspect, in a second possible implementation manner of the first aspect, when the terminal is in an international roaming state, the data switch includes a data traffic switch and an international roaming switch;

the detecting, by a terminal, a status of a data switch includes:

detecting at least one of a status of the data traffic switch or a status of the international roaming switch; and the sending, by the terminal, a public data network PDN disconnection request to a mobility management entity MME after the status of the data switch is changed from the enabled state to the disabled state includes:

sending, by the terminal, the public data network PDN disconnection request to the mobility management entity MME after the status of the data traffic switch is changed from the enabled state to the disabled state or after the status of the international roaming switch is changed from the enabled state to the disabled state.

With reference to the first possible implementation manner of the first aspect, in a third possible implementation manner of the first aspect, when the terminal is in an international roaming state, the data switch includes a data traffic switch and an international roaming switch;

the detecting, by a terminal, a status of a data switch includes:

detecting at least one of a status of the data traffic switch or a status of the international roaming switch; and the sending a PDN connection request to the MME after the status of the data switch is changed from the disabled state to the enabled state includes:

sending the PDN connection request to the MME after the status of the data traffic switch is changed from the disabled state to the enabled state and after the status of the international roaming switch is changed from the disabled state to the enabled state.

With reference to the first aspect or the first possible implementation manner of the first aspect, in a fourth possible implementation manner of the first aspect, when the terminal is in a non-international roaming state, the data switch includes a data traffic switch;

the detecting, by a terminal, a status of a data switch includes:

detecting a status of the data traffic switch; and the sending, by the terminal, a public data network PDN disconnection request to a mobility management entity MME after the status of the data switch is changed from the enabled state to the disabled state includes:

sending, by the terminal, the public data network PDN disconnection request to the mobility management entity MME after the status of the data traffic switch is changed from the enabled state to the disabled state.

With reference to the first possible implementation manner of the first aspect, in a fifth possible implementation manner of the first aspect, when the terminal is in a non-international roaming state, the data switch includes a data traffic switch;

the detecting, by a terminal, a status of a data switch includes:

detecting a status of the data traffic switch; and the sending a PDN connection request to the MME after the status of the data switch is changed from the disabled state to the enabled state includes:

sending the PDN connection request to the MME after the status of the data traffic switch is changed from the disabled state to the enabled state.

According to a second aspect, an embodiment of the present invention provides a data processing method, including:

receiving, by a mobility management entity MME, a public data network PDN disconnection request sent by a terminal, where the PDN disconnection request carries information about a data bearer corresponding to a data domain access point name APN; and deleting, according to the PDN disconnection request, the data bearer corresponding to the APN.

With reference to the second aspect, in a first possible implementation manner of the second aspect, the method further includes:

receiving a PDN connection request sent by the terminal, where the PDN connection request carries a data-type APN; and establishing a data bearer according to the data-type APN.

According to a third aspect, an embodiment of the present invention provides a data processing method, including:

determining a status of a data switch, where the status includes a disabled state or an enabled state;

setting, to a first preset value when the data switch is in the disabled state, an encryption option transmission identity carried in an attach request, where the encryption option transmission identity that is set to the first preset value is used to indicate that the data switch is in the disabled state; and setting the encryption option transmission identity to a second preset value when the data switch is in the enabled state, where the encryption option transmission identity that is set to the second preset value is used to indicate that the data switch is in the enabled state;

sending the attach request to a mobility management entity MME;

receiving an encryption option request sent by the MME, where the encryption option request is sent to the terminal when the MME detects that the encryption option transmission identity is the first preset value, and the encryption option request is used to obtain, from the terminal, an Internet Protocol IP multimedia subsystem IMS access point name APN required for establishing a bearer in an attach procedure; and sending the IMS APN to the MME, so that the MME establishes a voice bearer according to the IMS APN.

With reference to the third aspect, in a first possible implementation manner of the third aspect, when the terminal is in an international roaming state, the data switch includes a data traffic switch and an international roaming switch;

the determining a status of a data switch includes:

determining at least one of a status of the data traffic switch or a status of the international roaming switch;

the setting, to a first preset value when the data switch is in the disabled state, an encryption option transmission identity carried in an attach request includes:

when the data traffic switch is in the disabled state or when the international roaming switch is in the disabled state, setting, to the first preset value, the encryption option transmission identity carried in the attach request; and the setting the encryption option transmission identity to a second preset value when the data switch is in the enabled state includes:

setting the encryption option transmission identity to the second preset value when the data traffic switch is in the enabled state and when the international roaming switch is in the enabled state.

With reference to the first possible implementation manner of the third aspect, in a second possible implementation manner of the third aspect, when the terminal is in a non-international roaming state, the data switch includes a data traffic switch;

the determining a status of a data switch includes:

determining a status of the data traffic switch;

the setting, to a first preset value when the data switch is in the disabled state, an encryption option transmission identity carried in an attach request includes:

when the data traffic switch is in the disabled state, setting, to the first preset value, the encryption option transmission identity carried in the attach request; and the setting the encryption option transmission identity to a second preset value when the data switch is in the enabled state includes:

setting the encryption option transmission identity to the second preset value when the data traffic switch is in the enabled state.

With reference to any one of the third aspect or the possible implementation manners of the third aspect, in a third possible implementation manner of the third aspect, the method further includes:

sending a PDN connection request to the MME, where the PDN connection request carries a data-type APN, so that the MME establishes a data bearer according to the data-type APN.

According to a fourth aspect, an embodiment of the present invention provides a data processing method, including:

receiving, by a mobility management entity MME, an attach request sent by a terminal, where the attach request carries an encryption option transmission identity, the encryption option transmission identity is a first preset value when a data switch of the terminal is in a disabled state, and the encryption option transmission identity is a second preset value when the data switch of the terminal is in an enabled state;

sending, by the MME, an encryption option request to the terminal when detecting that the encryption option transmission identity is the first preset value, where the encryption option request is used to obtain, from the terminal, an Internet Protocol IP multimedia subsystem IMS access point name APN required for establishing a bearer in an attach procedure;

receiving the IMS APN sent by the terminal; and establishing a voice bearer according to the IMS APN.

With reference to the fourth aspect, in a first possible implementation manner of the fourth aspect, the method further includes:

receiving a PDN connection request sent by the terminal, where the PDN connection request carries a data-type APN; and establishing a data bearer according to the data-type APN.

According to a fifth aspect, an embodiment of the present invention provides a data processing apparatus, including:

a processing unit, configured to detect a status of a data switch of a terminal, where the status includes a disabled state or an enabled state; and a transceiver unit, configured to send a public data network PDN disconnection request to a mobility management entity MME after the status of the data switch is changed from the enabled state to the disabled state, where the PDN disconnection request carries information about a data bearer corresponding to a data domain access point name APN, and the PDN disconnection request is used to trigger the MME to delete the data bearer corresponding to the APN.

With reference to the fifth aspect, in a first possible implementation manner of the fifth aspect, the transceiver unit is further configured to send a PDN connection request to the MME after the status of the data switch is changed from the disabled state to the enabled state, where the PDN connection request carries a data-type APN, so that the MME establishes a data bearer according to the data-type APN.

With reference to the fifth aspect or the first possible implementation manner of the fifth aspect, in a second possible implementation manner of the fifth aspect, when the terminal is in an international roaming state, the data switch includes a data traffic switch and an international roaming switch; the processing unit is further configured to detect at least one of a status of the data traffic switch or a status of the international roaming switch; and the transceiver unit is configured to send the public data network PDN disconnection request to the mobility management entity MME when the status of the data traffic switch is changed from the enabled state to the disabled state or when the status of the international roaming switch is changed from the enabled state to the disabled state.

With reference to the first possible implementation manner of the fifth aspect or the second possible implementation manner of the fifth aspect, in a third possible implementation manner of the fifth aspect, the transceiver unit is further configured to send the PDN connection request to the MME after the status of the data traffic switch is changed from the disabled state to the enabled state and after the status of the international roaming switch is changed from the disabled state to the enabled state.

With reference to the fifth aspect or the first possible implementation manner of the fifth aspect, in a fourth possible implementation manner of the fifth aspect, when the terminal is in a non-international roaming state, the data switch includes a data traffic switch; the processing unit is further configured to detect a status of the data traffic switch; and the transceiver unit is configured to send the public data network PDN disconnection request to the mobility management entity MME after the status of the data traffic switch is changed from the enabled state to the disabled state.

With reference to the first possible implementation manner of the fifth aspect or the fourth possible implementation manner of the fifth aspect, in a fifth possible implementation manner of the fifth aspect, the transceiver unit is further configured to send the PDN connection request to the MME after the status of the data traffic switch is changed from the disabled state to the enabled state.

According to a sixth aspect, an embodiment of the present invention provides a data processing apparatus, including:

a transceiver unit, configured to receive a public data network PDN disconnection request sent by a terminal, where the PDN disconnection request carries information about a data bearer corresponding to a data domain access point name APN; and a processing unit, configured to delete, according to the PDN disconnection request, the data bearer corresponding to the APN.

With reference to the sixth aspect, in a first possible implementation manner of the sixth aspect, the transceiver unit is further configured to receive a PDN connection request sent by the terminal, where the PDN connection request carries a data-type APN; and the processing unit is further configured to establish a data bearer according to the data-type APN.

According to a seventh aspect, an embodiment of the present invention provides a data processing apparatus, including:

a processing unit, configured to: determine a status of a data switch, where the status includes a disabled state or an enabled state; when the data switch is in the disabled state, set, to a first preset value, an encryption option transmission identity carried in an attach request, where the encryption option transmission identity that is set to the first preset value is used to indicate that the data switch is in the disabled state; and set the encryption option transmission identity to a second preset value when the data switch is in the enabled state, where the encryption option transmission identity that is set to the second preset value is used to indicate that the data switch is in the enabled state; and a transceiver unit, configured to: send the attach request to a mobility management entity MME; receive an encryption option request sent by the MME, where the encryption option request is sent to the terminal when the MME detects that the encryption option transmission identity is the first preset value, and the encryption option request is used to obtain, from the terminal, an Internet Protocol IP multimedia subsystem IMS access point name APN required for establishing a bearer in an attach procedure; and send the IMS APN to the MME, so that the MME establishes a voice bearer according to the IMS APN.

With reference to the seventh aspect, in a first possible implementation manner of the seventh aspect, when the terminal is in an international roaming state, the data switch includes a data traffic switch and an international roaming switch; and the processing unit is further configured to: determine at least one of a status of the data traffic switch or a status of the international roaming switch; when the data traffic switch is in the disabled state or when the international roaming switch is in the disabled state, set, to the first preset value, the encryption option transmission identity carried in the attach request; and set the encryption option transmission identity to the second preset value when the data traffic switch is in the enabled state and when the international roaming switch is in the enabled state.

With reference to the first possible implementation manner of the seventh aspect, in a second possible implementation manner of the seventh aspect, when the terminal is in a non-international roaming state, the data switch includes a data traffic switch; and the processing unit is further configured to: determine a status of the data traffic switch; when the data traffic switch is in the disabled state, set, to the first preset value, the encryption option transmission identity carried in the attach request; and set the encryption option transmission identity to the second preset value when the data traffic switch is in the enabled state.

With reference to any one of the seventh aspect or the possible implementation manners of the seventh aspect, in a third possible implementation manner of the seventh aspect, the transceiver unit is further configured to send a PDN connection request to the MME, where the PDN connection request carries a data-type APN, so that the MME establishes a data bearer according to the data-type APN.

According to an eighth aspect, an embodiment of the present invention provides a data processing apparatus, including:

a transceiver unit, configured to: receive an attach request sent by a terminal, where the attach request carries an encryption option transmission identity and is used to trigger the MME to execute an attach procedure, the encryption option transmission identity is a first preset value when a data switch of the terminal is in a disabled state, and the encryption option transmission identity is a second preset value when the data switch of the terminal is in an enabled state; send an encryption option request to the terminal when the MME detects that the encryption option transmission identity is the first preset value, where the encryption option request is used to obtain, from the terminal, an Internet Protocol IP multimedia subsystem IMS access point name APN required for establishing a bearer in the attach procedure; and receive the IMS APN sent by the terminal; and a processing unit, configured to establish a voice bearer according to the IMS APN.

With reference to the eighth aspect, in a first possible implementation manner of the eighth aspect, the transceiver unit is further configured to receive a PDN connection request sent by the terminal, where the PDN connection request carries a data-type APN; and the processing unit is further configured to establish a data bearer according to the data-type APN.

According to a ninth aspect, an embodiment of the present invention provides a data processing terminal, including:

a processor, configured to detect a status of a data switch of the terminal, where the status includes a disabled state or an enabled state; and a transceiver, configured to send a public data network PDN disconnection request to a mobility management entity MME after the status of the data switch is changed from the enabled state to the disabled state, where the PDN disconnection request carries information about a data bearer corresponding to a data domain access point name APN, and the PDN disconnection request is used to trigger the MME to delete the data bearer corresponding to the APN.

With reference to the ninth aspect, in a first possible implementation manner of the ninth aspect, the transceiver is further configured to send a PDN connection request to the MME after the status of the data switch is changed from the disabled state to the enabled state, where the PDN connection request carries a data-type APN, so that the MME establishes a data bearer according to the data-type APN.

With reference to the ninth aspect or the first possible implementation manner of the ninth aspect, in a second possible implementation manner of the ninth aspect, when the terminal is in an international roaming state, the data switch includes a data traffic switch and an international roaming switch; and the processor is further configured to detect at least one of a status of the data traffic switch or a status of the international roaming switch; and the transceiver is configured to send the public data network PDN disconnection request to the mobility management entity MME after the status of the data traffic switch is changed from the enabled state to the disabled state or after the status of the international roaming switch is changed from the enabled state to the disabled state.

With reference to the first possible implementation manner of the ninth aspect or the second possible implementation manner of the ninth aspect, in a third possible implementation manner of the ninth aspect, the transceiver is further configured to send the PDN connection request to the MME after the status of the data traffic switch is changed from the disabled state to the enabled state and after the status of the international roaming switch is changed from the disabled state to the enabled state.

With reference to the ninth aspect or the first possible implementation manner of the ninth aspect, in a fourth possible implementation manner of the ninth aspect, when the terminal is in a non-international roaming state, the data switch includes a data traffic switch; and the processor is further configured to detect a status of the data traffic switch; and the transceiver is configured to send the public data network PDN disconnection request to the mobility management entity MME after the status of the data traffic switch is changed from the enabled state to the disabled state.

With reference to the first possible implementation manner of the ninth aspect or the fourth possible implementation manner of the ninth aspect, in a fifth possible implementation manner of the ninth aspect, the transceiver is further configured to send the PDN connection request to the MME after the status of the data traffic switch is changed from the disabled state to the enabled state.

According to a tenth aspect, an embodiment of the present invention provides a data processing mobility management entity, including:

a transceiver, configured to receive a public data network PDN disconnection request sent by a terminal, where the PDN disconnection request carries information about a data bearer corresponding to a data domain access point name APN; and a processor, configured to delete, according to the PDN disconnection request, the data bearer corresponding to the APN.

With reference to the tenth aspect, in a first possible implementation manner of the tenth aspect, the transceiver is further configured to receive a PDN connection request sent by the terminal, where the PDN connection request carries a data-type APN; and the processor is further configured to establish a data bearer according to the data-type APN.

According to an eleventh aspect, an embodiment of the present invention provides a data processing terminal, including:

a processor, configured to: determine a status of a data switch, where the status includes a disabled state or an enabled state; when the data switch is in the disabled state, set, to a first preset value, an encryption option transmission identity carried in an attach request, where the encryption option transmission identity that is set to the first preset value is used to indicate that the data switch is in the disabled state; and set the encryption option transmission identity to a second preset value when the data switch is in the enabled state, where the encryption option transmission identity that is set to the second preset value is used to indicate that the data switch is in the enabled state; and a transceiver, configured to: send the attach request to a mobility management entity MME; receive an encryption option request sent by the MME, where the encryption option request is sent to the terminal when the MME detects that the encryption option transmission identity is the first preset value, and the encryption option request is used to obtain, from the terminal, an Internet Protocol IP multimedia subsystem IMS access point name APN required for establishing a bearer in an attach procedure; and send the IMS APN to the MME, so that the MME establishes a voice bearer according to the IMS APN.

With reference to the eleventh aspect, in a first possible implementation manner of the eleventh aspect, when the terminal is in an international roaming state, the data switch includes a data traffic switch and an international roaming switch; and the processor is further configured to: determine at least one of a status of the data traffic switch or a status of the international roaming switch; when the data traffic switch is in the disabled state or when the international roaming switch is in the disabled state, set, to the first preset value, the encryption option transmission identity carried in the attach request; and set the encryption option transmission identity to the second preset value when the data traffic switch is in the enabled state and when the international roaming switch is in the enabled state.

With reference to the eleventh aspect, in a second possible implementation manner of the eleventh aspect, when the terminal is in a non-international roaming state, the data switch includes a data traffic switch; and the processor is further configured to: determine a status of the data traffic switch; when the data traffic switch is in the disabled state, set, to the first preset value, the encryption option transmission identity carried in the attach request; and set the encryption option transmission identity to the second preset value when the data traffic switch is in the enabled state.

With reference to any one of the eleventh aspect or the possible implementation manners of the eleventh aspect, in a third possible implementation manner of the eleventh aspect, the transceiver is further configured to send a PDN connection request to the MME, where the PDN connection request carries a data-type APN, so that the MME establishes a data bearer according to the data-type APN.

According to a twelfth aspect, an embodiment of the present invention provides a data processing mobility management entity, including:

a transceiver, configured to: receive an attach request sent by a terminal, where the attach request carries an encryption option transmission identity, the encryption option transmission identity is a first preset value when a data switch of the terminal is in a disabled state, and the encryption option transmission identity is a second preset value when the data switch of the terminal is in an enabled state; send an encryption option request to the terminal when the MME detects that the encryption option transmission identity is the first preset value, where the encryption option request is used to obtain, from the terminal, an Internet Protocol IP multimedia subsystem IMS access point name APN required for establishing a bearer in an attach procedure; and receive the IMS APN sent by the terminal; and a processor, configured to establish a voice bearer according to the IMS APN.

With reference to the twelfth aspect, in a first possible implementation manner of the twelfth aspect, the transceiver is further configured to receive a PDN connection request sent by the terminal, where the PDN connection request carries a data-type APN; and the processor is further configured to establish a data bearer according to the data-type APN.

According to a thirteenth aspect, an embodiment of the present invention provides a data processing system, including the terminal according to the ninth aspect and the mobility management entity according to the tenth aspect.

According to a fourteenth aspect, an embodiment of the present invention provides a data processing system, including the terminal according to the eleventh aspect and the mobility management entity according to the twelfth aspect.

In one aspect, the embodiments of the present invention provide a data processing method, apparatus, terminal, mobility management entity, and system. In the present invention, a terminal detects a status of a data switch. When the data switch is changed from enabled to disabled, it indicates that the terminal does not need to perform data-domain data transmission with a network. In this case, the terminal sends, to a mobility management entity MME, a PDN disconnection request that carries information about a data bearer corresponding to a data domain APN. After receiving the PDN disconnection request, the MME executes a data bearer deleting procedure to delete the data bearer corresponding to the data domain APN. In this way, after the data switch is disabled, the terminal sends the PDN disconnection request to the MME, so that the MME executes the data bearer deleting procedure, that is, deletes a channel for performing data transmission between the terminal and the network, so as to ensure that no data-domain data transmission is performed between the terminal and the network anymore, and avoid wasting data transmission resources and bringing an unnecessary loss to a user of the terminal.

In another aspect, the embodiments of the present invention provide a data processing method, apparatus, terminal, mobility management entity, and system. In the present invention, a terminal first determines whether a data switch is in a disabled state; when the data switch is in the disabled state, sets, to a first preset value that is used to indicate that the data switch is in the disabled state, an encryption option transmission identity carried in an attach request; when the data switch is in an enabled state, sets the encryption option transmission identity to a second preset value that is used to indicate that the data switch is in the enabled state; and then sends the attach request to an MME. After receiving the attach request that carries the encryption option transmission identity and is sent by the terminal, the MME detects a value of the encryption option transmission identity; and sends an encryption option request to the terminal when the encryption option transmission identity is the first preset value, so as to obtain, from the terminal, an IMS APN required for establishing a bearer in an attach procedure. After receiving the encryption option request sent by the MME, the terminal sends the IMS APN to the MME. The MME establishes a voice bearer according to the received IMS APN. In this way, when the data switch is in the disabled state, the terminal sets, to the first preset value that is used to indicate that the data switch is in the disabled state, the encryption option transmission identity carried in the attach request, to indicate that an APN required for establishing a bearer in this attach procedure is an IMS APN. After obtaining the IMS APN from the terminal, the MME establishes the voice bearer. Because the APN required for establishing the bearer is the IMS APN, and the MME cannot establish a data bearer by using the IMS APN, a channel for performing data transmission between the terminal and a network cannot be established, so as to ensure that no data-domain data transmission is performed between the terminal and the network, and avoid wasting data transmission resources and bringing an unnecessary loss to a user of the terminal.

BRIEF DESCRIPTION OF DRAWINGS

To describe technical solutions in embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes technical solutions in embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention may be applied to a scenario in which a data bearer and a voice bearer are established between a terminal and a network or a scenario in which a terminal enters a network to which the terminal is not attached, and starts to execute an attach procedure. If a terminal needs to perform data transmission with a network, a data bearer needs to be first established, and then the data transmission can be performed. After the bearer is established, even if no data transmission is performed between the terminal and the network in a period of time, information about the established bearer still exists, and after the terminal or the network re-initiates a session, data transmission can still be performed.

Figure 1:
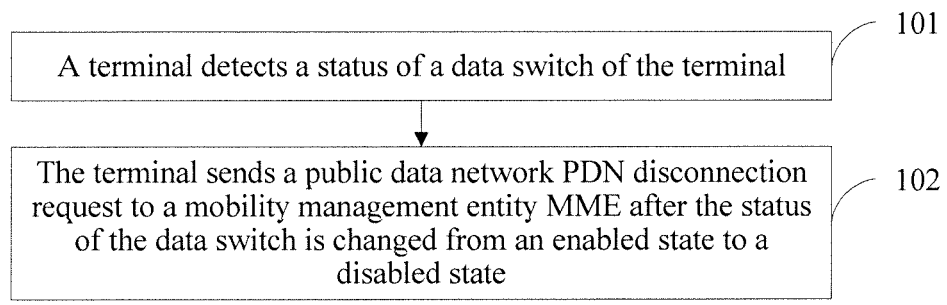
FIG. 1 is a flowchart of a method according to an embodiment of the present invention.

An embodiment of the present invention provides a data processing method, which is used by a terminal, as shown in FIG. 1. This embodiment may be applied to a scenario in which a data bearer and a voice bearer are established between a terminal and a network. The method includes the following steps.

101. The terminal detects a status of a data switch of the terminal.

The status includes a disabled state or an enabled state.

Optionally, when the terminal is in an international roaming state, the data switch includes a data traffic switch and an international roaming switch, and a specific manner in which the terminal detects the status of the data switch is detecting at least one of a status of the data traffic switch or a status of the international roaming switch. When the terminal is in a non-international roaming state, the data switch includes a data traffic switch, and a specific manner in which the terminal detects the status of the data switch is detecting a status of the data traffic switch.

102. The terminal sends a public data network PDN disconnection request to a mobility management entity MME after the status of the data switch is changed from an enabled state to a disabled state.

The PDN (public data network) disconnection request carries information about a data bearer corresponding to a data domain APN, and is used by the MME (mobility management entity) to delete the data bearer.

Optionally, after the terminal sends the public data network PDN disconnection request to the MME, when the data switch is changed from disabled to enabled, the terminal sends, to the MME, a PDN connection request that carries a data-type APN, so that the MME establishes a data bearer according to the data-type APN, so that the terminal can perform data-domain data transmission with a network.

Optionally, when the terminal is in the international roaming state, the terminal needs to detect at least one of the status of the data traffic switch or the status of the international roaming switch. The terminal sends the public data network PDN disconnection request to the mobility management entity MME after the status of the data traffic switch is changed from the enabled state to the disabled state or after the status of the international roaming switch is changed from the enabled state to the disabled state; and sends the PDN connection request to the MME after the status of the data traffic switch is changed from the disabled state to the enabled state and after the status of the international roaming switch is changed from the disabled state to the enabled state. When the terminal is in the non-international roaming state, the terminal needs to detect the status of the data traffic switch. The terminal sends the public data network PDN disconnection request to the mobility management entity MME after the status of the data traffic switch is changed from the enabled state to the disabled state; and sends the PDN connection request to the MME after the status of the data traffic switch is changed from the disabled state to the enabled state.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, a terminal detects a status of a data switch. When the data switch is changed from enabled to disabled, it indicates that the terminal does not need to perform data information transmission with a network. In this case, the terminal sends, to a mobility management entity MME, a PDN disconnection request that carries information about a data bearer corresponding to a data domain APN, so that after receiving the PDN disconnection request, the MME executes a data bearer deleting procedure. In this way, a channel for performing data transmission between the terminal and the network is deleted, so as to ensure that no data transmission is performed between the terminal and the network anymore, and avoid wasting data transmission resources and bringing an unnecessary loss to a user of the terminal.

In addition, it should be noted that a data bearer and a voice bearer are established between a terminal and a network at the same time, the data bearer is used for performing data-domain data transmission between the terminal and the network, and the voice bearer is used for performing voice-domain data transmission between the terminal and the network. In the prior art, after a data switch is disabled, a terminal does not send data to a network anymore, that is, not only controls the terminal not to send data in a data domain to the network anymore, but also enables the terminal not to send data in a voice domain to the network anymore, thereby affecting use of a voice service of the terminal. In this embodiment of the present invention, after a data switch is disabled, a terminal sends a PDN disconnection request to an MME to request the MME to delete a data bearer, but does not control sending of data to a network by the terminal, so that a voice service of the terminal can be normally used.

Figure 2:
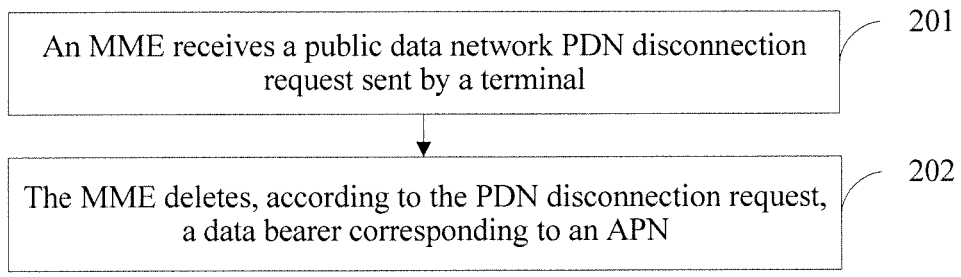
FIG. 2 is a flowchart of a method according to another embodiment of the present invention.

Another embodiment of the present invention provides a data processing method, which is used by an MME. As shown in FIG. 2, the method includes the following steps.

201. The MME receives a public data network PDN disconnection request sent by a terminal.

The PDN disconnection request carries information about a data bearer corresponding to a data domain access point name APN.

202. The MME deletes, according to the PDN disconnection request, a data bearer corresponding to an APN.

Optionally, the MME may further receive a PDN connection request that carries a data-type APN and is sent by the terminal; and then establish a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, after a data switch of a terminal is changed from enabled to disabled, an MME receives a PDN disconnection request, and then executes a data bearer deleting procedure according to the PDN disconnection request, to delete a data bearer corresponding to a data domain APN, that is, to delete a channel for performing data transmission between the terminal and a network, so as to ensure that no data-domain data transmission is performed between the terminal and the network anymore, and avoid wasting data transmission resources and bringing an unnecessary loss to a user of the terminal.

In addition, it should be noted that a data bearer and a voice bearer are established between a terminal and a network at the same time, the data bearer is used for performing data-domain data transmission between the terminal and the network, and the voice bearer is used for performing voice-domain data transmission between the terminal and the network. In the prior art, after a data switch is disabled, a terminal does not send data to a network anymore, that is, not only controls the terminal not to send data in a data domain to the network anymore, but also enables the terminal not to send data in a voice domain to the network anymore, thereby affecting use of a voice service of the terminal. In this embodiment of the present invention, after a data switch of a terminal is disabled, an MME receives a PDN disconnection request sent by the terminal, and deletes a data bearer. Because the terminal does not control sending of data to a network by the terminal, the network can still perform voice-domain data transmission with the terminal, and a voice service of the terminal can be normally used.

Figure 3:
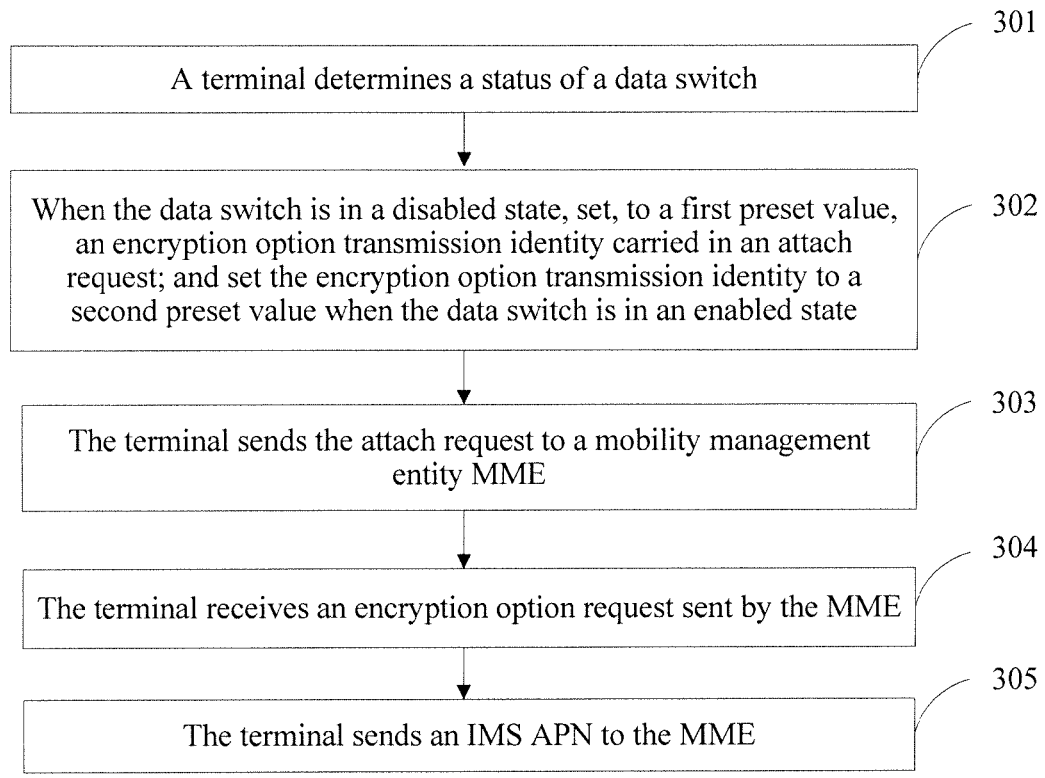
FIG. 3 is a flowchart of a method according to another embodiment of the present invention.

Another embodiment of the present invention provides a data processing method, which is used by a terminal, as shown in FIG. 3. This embodiment may be applied to a scenario in which a terminal enters a network to which the terminal is not attached, and starts to execute an attach procedure. The method includes the following steps.

301. The terminal determines a status of a data switch.

The status includes a disabled state or an enabled state.

Optionally, when the terminal is in an international roaming state, the data switch includes a data traffic switch and an international roaming switch, and a specific manner in which the terminal determines the status of the data switch is determining at least one of a status of the data traffic switch or a status of the international roaming switch. When the terminal is in a non-international roaming state, the data switch includes a data traffic switch, and a specific manner in which the terminal determines the status of the data switch is determining a status of the data traffic switch.

302. When the data switch is in a disabled state, set, to a first preset value, an encryption option transmission identity carried in an attach request; and set the encryption option transmission identity to a second preset value when the data switch is in an enabled state.

The encryption option transmission identity that is set to the first preset value is used to indicate that the data switch is in the disabled state, and the encryption option transmission identity that is set to the second preset value is used to indicate that the data switch is in the enabled state.

Optionally, when the terminal is in the international roaming state, the terminal needs to determine at least one of the status of the data traffic switch or the status of the international roaming switch; when the data traffic switch is in the disabled state or when the international roaming switch is in the disabled state, sets, to the first preset value, the encryption option transmission identity carried in the attach request; and sets the encryption option transmission identity to the second preset value when the data traffic switch is in the enabled state and when the international roaming switch is in the enabled state. When the terminal is in the non-international roaming state, the terminal needs to determine the status of the data traffic switch; when the data traffic switch is in the disabled state, sets, to the first preset value, the encryption option transmission identity carried in the attach request; and sets the encryption option transmission identity to the second preset value when the data traffic switch is in the enabled state.

303. The terminal sends the attach request to a mobility management entity MME.

304. The terminal receives an encryption option request sent by the MME.

The encryption option request is sent to the terminal when the MME detects that the encryption option transmission identity is the first preset value, and the encryption option request is used to obtain, from the terminal, an Internet Protocol IP multimedia subsystem IMS access point name APN required for establishing a bearer in an attach procedure.

305. The terminal sends an IMS APN to the MME.

The terminal sends the IMS APN to the MME, so that the MME establishes a voice bearer according to the IMS APN.

Optionally, the terminal may further send a PDN connection request to the MME, where the PDN connection request carries a data-type APN, so that the MME establishes a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, a terminal first determines whether a data switch is in a disabled state; when the data switch is in the disabled state, sets, to a first preset value that is used to indicate that the data switch is in the disabled state, an encryption option transmission identity carried in an attach request; when the data switch is in an enabled state, sets the encryption option transmission identity to a second preset value that is used to indicate that the data switch is in the enabled state; and then sends the attach request to an MME. After receiving an encryption option request sent by the MME, the terminal sends an IMS APN to the MME, so that the MME establishes a voice bearer according to the received IMS APN. In this way, when the data switch is in the disabled state, the terminal sets, to the first preset value that is used to indicate that the data switch is in the disabled state, the encryption option transmission identity carried in the attach request, to indicate that an APN required for establishing a bearer in this attach procedure is an IMS APN. After obtaining the IMS APN from the terminal, the MME establishes the voice bearer. Because the APN required for establishing the bearer is the IMS APN, and the MME cannot establish a data bearer by using the IMS APN, a channel for performing data transmission between the terminal and a network cannot be established, so as to ensure that no data-domain data transmission is performed between the terminal and the network, and avoid wasting data transmission resources and bringing an unnecessary loss to a user of the terminal.

In addition, it should be noted that when a terminal is being attached to a network, a data bearer and a voice bearer are established between the terminal and the network at the same time. The data bearer is used for performing data-domain data transmission between the terminal and the network, and the voice bearer is used for performing voice-domain data transmission between the terminal and the network. In the prior art, when a data switch is in a disabled state, a terminal does not send data to a network anymore, that is, not only controls the terminal not to send data in a data domain to the network anymore, but also enables the terminal not to send data in a voice domain to the network anymore. Therefore, the terminal cannot be attached to the network, and use of a voice service of the terminal is affected. In this embodiment of the present invention, when a terminal starts to be attached to a network, if a data switch is in a disabled state, only a voice bearer is established but a data bearer is not established between the terminal and the network in an attach procedure, the network can perform voice-domain data transmission with the terminal, and a voice service of the terminal can be normally used.

Figure 4:
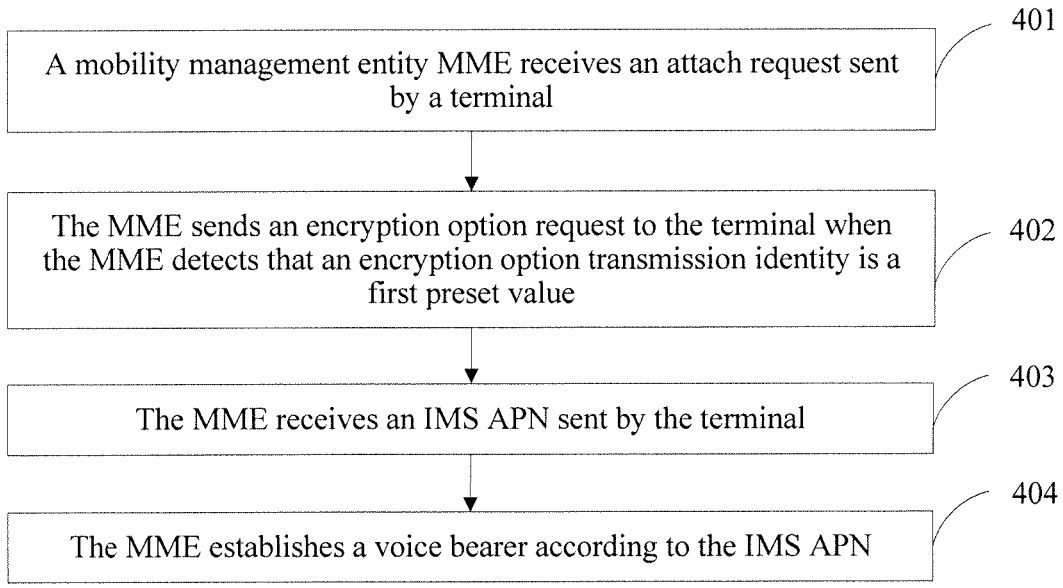
FIG. 4 is a flowchart of a method according to another embodiment of the present invention.

Another embodiment of the present invention provides a data processing method, which is used by an MME. As shown in FIG. 4, the method includes the following steps.

401. The mobility management entity MME receives an attach request sent by a terminal.

The attach request carries an encryption option transmission identity. The encryption option transmission identity is a first preset value when a data switch of the terminal is in a disabled state, and the encryption option transmission identity is a second preset value when the data switch of the terminal is in an enabled state.

402. The MME sends an encryption option request to the terminal when the MME detects that an encryption option transmission identity is a first preset value.

The encryption option request is used to obtain, from the terminal, an Internet Protocol IP multimedia subsystem IMS access point name APN required for establishing a bearer in an attach procedure.

403. The MME receives an IMS APN sent by the terminal.

404. The MME establishes a voice bearer according to the IMS APN.

Optionally, the MME may further receive a PDN connection request sent by the terminal, where the PDN connection request carries a data-type APN; and then establish a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, after receiving an attach request that carries an encryption option transmission identity and is sent by a terminal, an MME detects a value of the encryption option transmission identity; and sends an encryption option request to the terminal when the encryption option transmission identity is a first preset value, so as to obtain, from the terminal, an IMS APN required for establishing a bearer in an attach procedure. After receiving the IMS APN sent by the terminal, the MME establishes a voice bearer according to the received IMS APN. In this way, after the encryption option transmission identity carried in the attach request is set to the first preset value that is used to indicate that a data switch is in a disabled state, the MME obtains the IMS APN from the terminal and establishes the voice bearer. Because an APN required for establishing a bearer is an IMS APN, and the MME cannot establish a data bearer by using the IMS APN, a channel for performing data transmission between the terminal and a network cannot be established, so as to ensure that no data-domain data transmission is performed between the terminal and the network, and avoid wasting data transmission resources and bringing an unnecessary loss to a user of the terminal.

In addition, it should be noted that when a terminal is being attached to a network, a data bearer and a voice bearer are established between the terminal and the network at the same time. The data bearer is used for performing data-domain data transmission between the terminal and the network, and the voice bearer is used for performing voice-domain data transmission between the terminal and the network. In the prior art, when a data switch is in a disabled state, a terminal does not send data to a network anymore, that is, not only controls the terminal not to send data in a data domain to the network anymore, but also enables the terminal not to send data in a voice domain to the network anymore. Therefore, the terminal cannot be attached to the network, and use of a voice service of the terminal is affected. In this embodiment of the present invention, when a terminal starts to be attached to a network, if a data switch is in a disabled state, only a voice bearer is established but a data bearer is not established between the terminal and the network in an attach procedure, the network can perform voice-domain data transmission with the terminal, and a voice service of the terminal can be normally used.

Figure 5:
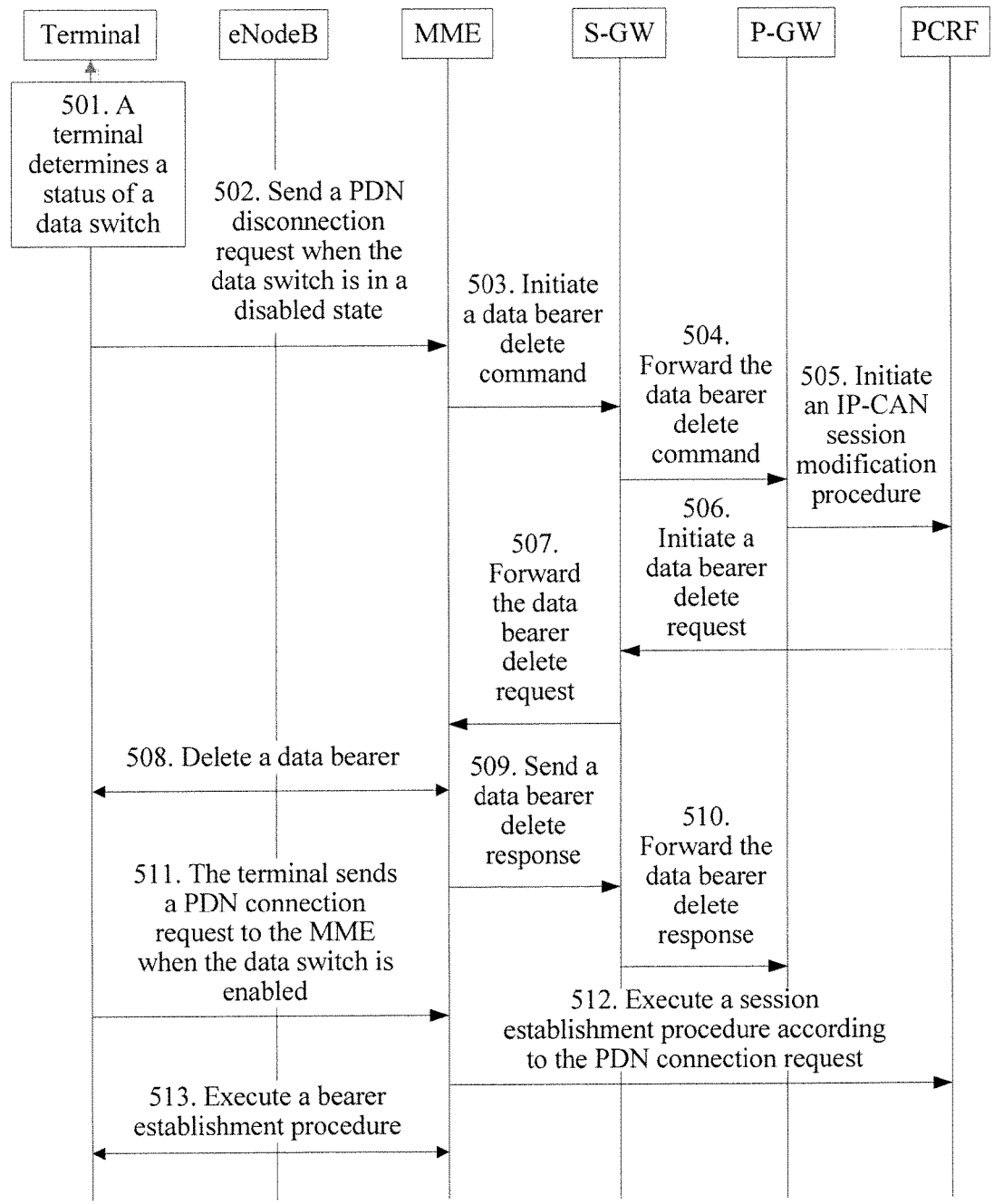
FIG. 5 is a flowchart of a method according to another embodiment of the present invention.

Another embodiment of the present invention provides a data processing method, which is used for data processing in a process in which a data switch is enabled or disabled during use of a terminal. A data processing system includes a terminal, an eNodeB (evolved NodeB), an MME, an S-GW (serving gateway), a P-GW (packet data network gateway), and a PCRF (policy control and charging rules function). The terminal can communicate with a network by means of wireless communication. The eNodeB is responsible for radio bearer control, radio access control, and connection mobility control. The MME is responsible for access control, mobility management, session management, network element selection, and the like. The S-GW has a function of supporting user plane data switching because of mobility of the terminal. The P-GW is a gateway that is responsible for accessing a packet data network by the terminal. The PCRF is a policy decision point of policy and charging control of a service data stream and an IP bearer resource in a network. As shown in FIG. 5, the method includes the following steps.

501. The terminal determines a status of a data switch.

The status includes a disabled state or an enabled state. When the terminal is in an international roaming state, the data switch includes a data traffic switch and an international roaming switch, and a specific manner in which the terminal detects the status of the data switch is detecting at least one of a status of the data traffic switch or a status of the international roaming switch. When the terminal is in a non-international roaming state, the data switch includes a data traffic switch, and a specific manner in which the terminal detects the status of the data switch is detecting a status of the data traffic switch.

502. Send a PDN disconnection request to the MME when the data switch is in a disabled state.

The PDN disconnection request carries a bearer session that is corresponding to a data domain APN and established between the terminal and a network. When the terminal is in the international roaming state, the terminal needs to detect at least one of the status of the data traffic switch or the status of the international roaming switch. The terminal sends the public data network PDN disconnection request to the mobility management entity MME after the status of the data traffic switch is changed from the enabled state to the disabled state or after the status of the international roaming switch is changed from the enabled state to the disabled state; and sends a PDN connection request to the MME after the status of the data traffic switch is changed from the disabled state to the enabled state and after the status of the international roaming switch is changed from the disabled state to the enabled state. When the terminal is in the non-international roaming state, the terminal needs to detect the status of the data traffic switch. The terminal sends the public data network PDN disconnection request to the mobility management entity MME after the status of the data traffic switch is changed from the enabled state to the disabled state; and sends a PDN connection request to the MME after the status of the data traffic switch is changed from the disabled state to the enabled state.

Optionally, if the terminal is in an idle state, the terminal needs to initiate a service request procedure to resume a connection and the bearer session, and then can send the PDN disconnection request to the MME.

It should be noted that the terminal enters the idle state if the terminal does not perform data-domain data transmission with the network for a long time, and when sending data to the network again, the terminal needs to first initiate the service request procedure to resume the connection to the network and the bearer session.

503. The MME initiates a data bearer delete command to the S-GW.

504. The S-GW forwards the data bearer delete command to the P-GW.

505. The P-GW initiates an IP-CAN (Internet Protocol Connectivity Access Network, IP connectivity access network) session modification procedure to the PCRF.

The IP-CAN session modification procedure is used to delete a data bearer session.

506. The PCRF responds to the P-GW and deletes a data bearer session, and the PCRF initiates a data bearer delete request to the S-GW.

507. The S-GW forwards the data bearer delete request to the MME.

508. Delete a data bearer between the MME and the terminal.

509. The MME sends a data bearer delete response to the S-GW.

The S-GW may learn, according to the data bearer delete response, that the data bearer has been deleted.

510. The S-GW forwards the data bearer delete response to the P-GW.

The P-GW may learn, according to the data bearer delete response, that the data bearer has been deleted.

It should be noted that the foregoing procedure is a procedure of deleting the data bearer after the data switch is disabled. When the data switch is enabled again, the terminal needs to send a data bearer establishment request to the MME to trigger the MME to execute a data bearer establishment procedure, so that the terminal can perform data-domain data transmission with the network. A specific procedure is as follows:

511. The terminal sends a PDN connection request to the MME when the data switch is enabled.

The PDN connection request carries a data-type APN.

Optionally, if the terminal is in an idle state when the data switch is enabled, the terminal needs to first initiate a service request procedure to resume a connection and a bearer session, and then can send the PDN connection request to the MME.

512. The MME executes a session establishment procedure according to the PDN connection request.

The session establishment procedure includes: The MME initiates a create session request to the S-GW, the S-GW initiates a create session request to the P-GW, a PCEF of the P-GW initiates an IP-CAN session establishment/modification procedure to the PCRF, the PCRF returns a create session response, the P-GW initiates a create session response to the S-GW, and the S-GW initiates a create session response to the MME.

513. The MME executes a data bearer establishment procedure.

The data bearer establishment procedure includes: The MME initiates a data bearer establishment request to the eNodeB, where the data bearer establishment request carries a default bearer activation request message; the eNodeB initiates an RRC reconfiguration procedure to the terminal; the terminal initiates an RRC reconfiguration complete procedure to the eNodeB; the eNodeB initiates a data bearer establishment response to the MME; the terminal initiates, to the eNodeB, a direct transfer message that carries a default bearer activation accept message that needs to be transferred to the MME; and the eNodeB sends, to the MME, a PDN connection complete message that carries the default bearer activation accept message sent by the terminal.

It should be noted that after the step is performed, the data bearer between the terminal and the network is established, and the terminal can send data to the network.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, a terminal detects a status of a data switch. When the data switch is disabled, it indicates that the terminal does not need to perform data-domain data transmission with a network. In this case, the terminal sends, to an MME, a PDN disconnection request that carries information about a data bearer corresponding to a data domain APN, so that after receiving the PDN disconnection request, the MME executes a data bearer deleting procedure. In this way, a channel for performing data transmission between the terminal and the network is deleted, so as to ensure that no data transmission is performed between the terminal and the network anymore, and avoid bringing an unnecessary loss to a user of the terminal.

In addition, it should be noted that a data bearer and a voice bearer are established between a terminal and a network at the same time, the data bearer is used for performing data-domain data transmission between the terminal and the network, and the voice bearer is used for performing voice-domain data transmission between the terminal and the network. In the prior art, after a data switch is disabled, a terminal does not send data to a network anymore, that is, not only controls the terminal not to send data in a data domain to the network anymore, but also enables the terminal not to send data in a voice domain to the network anymore, thereby affecting use of a voice service of the terminal. In this embodiment of the present invention, after a data switch is disabled, a terminal sends a PDN disconnection request to an MME to request the MME to delete a data bearer, but does not control sending of data to a network by the terminal, so that a voice service of the terminal can be normally used.

Figure 6A:
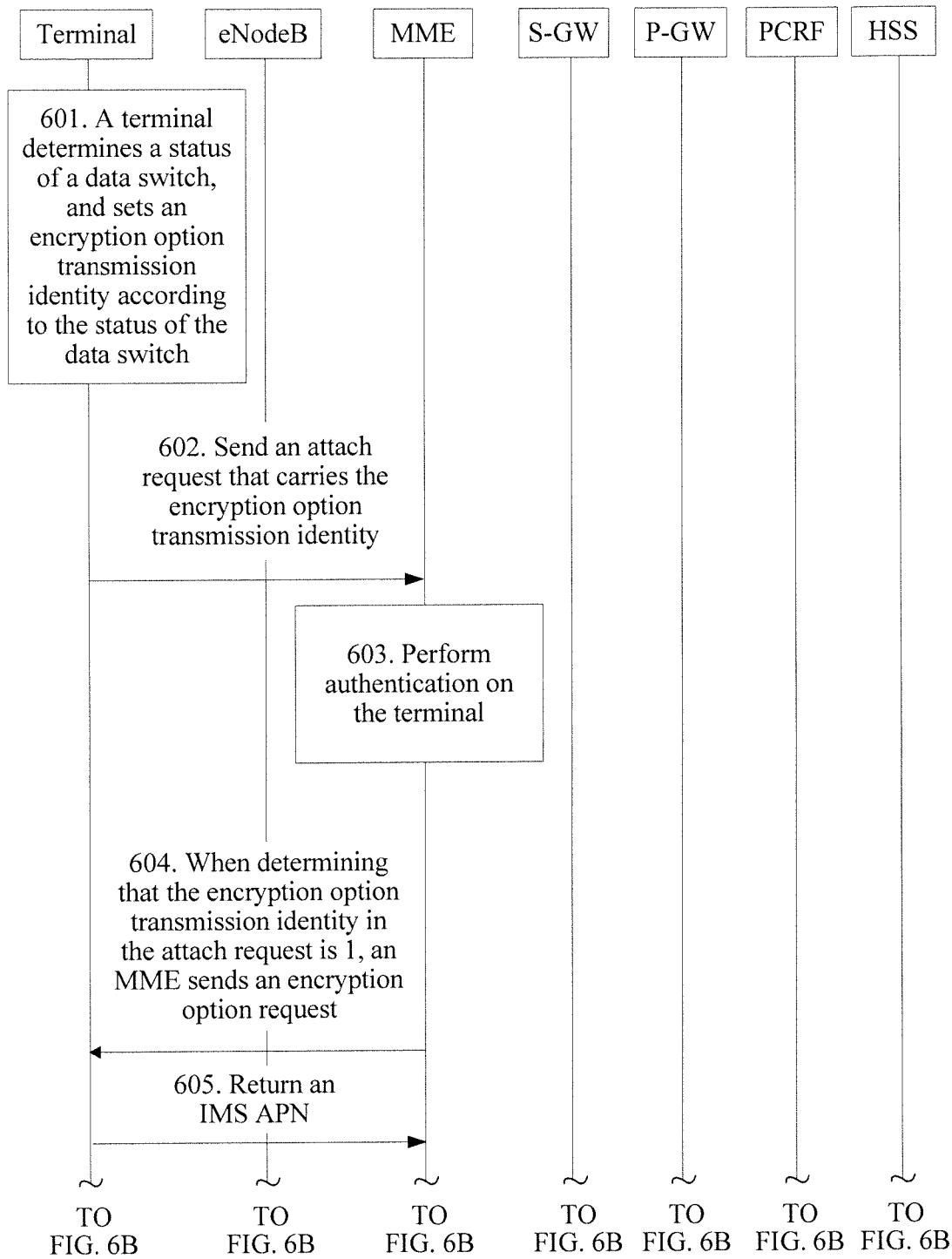
FIG. 6A and FIG. 6B are a flowchart of a method according to another embodiment of the present invention.
Figure 6B:
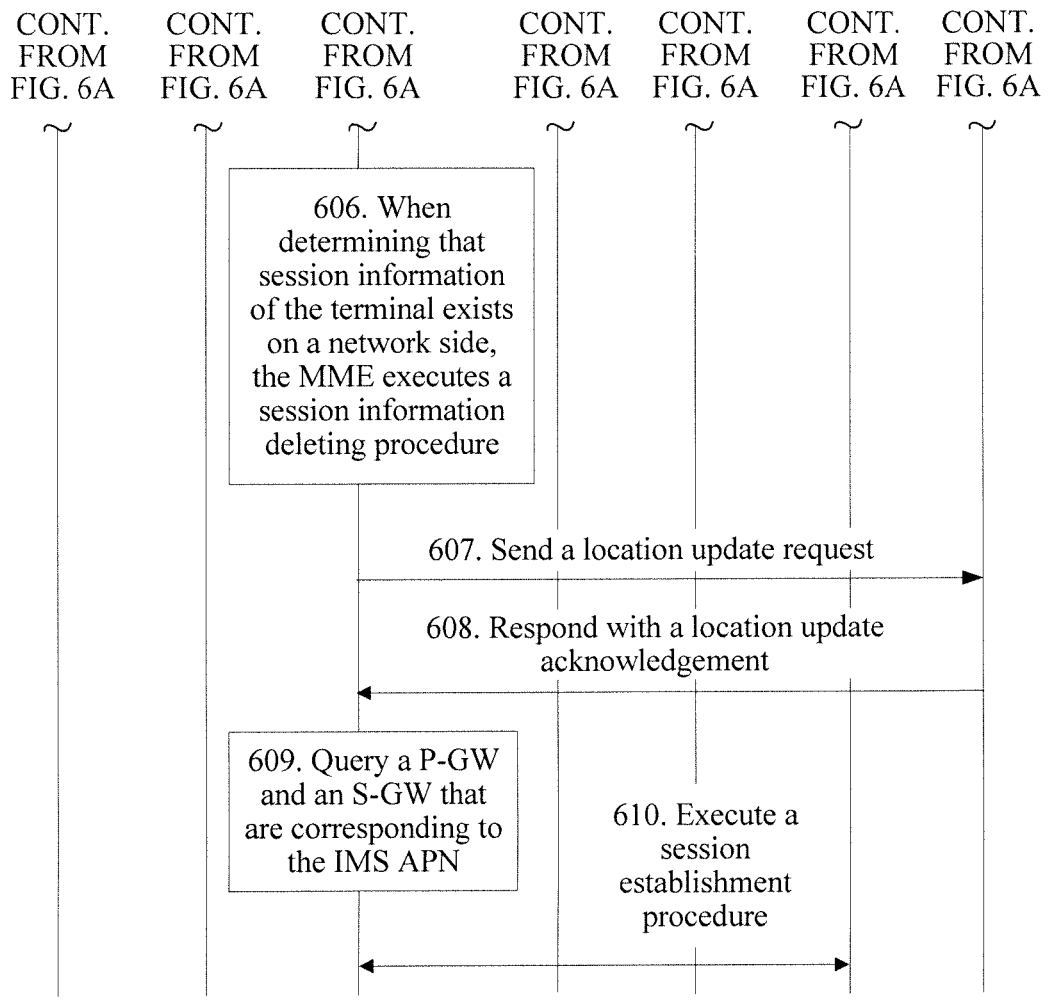

Another embodiment of the present invention provides a data processing method, which is used for data processing when a terminal is being attached to a network. A data processing system includes a terminal, an eNodeB, an MME, an S-GW, a P-GW, a PCRF, and an HSS (home subscriber server). Functions of the terminal, the eNodeB, the MME, the S-GW, the P-GW, and the PCRF in the system are the same as functions of those in the embodiment shown in FIG. 5. The HSS is responsible for identity authentication and authorization of a user, and may provide information about a physical location of the user. As shown in FIG. 6A and FIG. 6B, the method includes the following steps.

601. The terminal determines a status of a data switch, and sets an encryption option transmission identity according to the status of the data switch.

When the terminal is in an international roaming state, the data switch includes a data traffic switch and an international roaming switch, and a specific manner in which the terminal determines the status of the data switch is determining at least one of a status of the data traffic switch or a status of the international roaming switch. When the terminal is in a non-international roaming state, the data switch includes a data traffic switch, and a specific manner in which the terminal determines the status of the data switch is determining a status of the data traffic switch.

When the terminal is in the international roaming state, the terminal needs to determine the status of the data traffic switch and the status of the international roaming switch; when the data traffic switch is in a disabled state or when the international roaming switch is in a disabled state, sets, to a first preset value, the encryption option transmission identity carried in an attach request; and sets the encryption option transmission identity to a second preset value when the data traffic switch is in an enabled state and when the international roaming switch is in an enabled state. When the terminal is in the non-international roaming state, the terminal needs to determine whether the data traffic switch is in a disabled state; when the data traffic switch is in the disabled state, sets, to a first preset value, the encryption option transmission identity carried in an attach request; and sets the encryption option transmission identity to a second preset value when the data traffic switch is in an enabled state.

In this embodiment of the present invention, when the encryption option transmission identity is set to the first preset value, for example, when the encryption option transmission identity is set to 1, it indicates that the terminal performs network attachment by using an APN selected by the terminal. When the status of the data switch is the enabled state, the encryption option transmission identity is a current default value.

It should be noted that when the status of the data switch is the disabled state, it indicates that a user does not want the terminal to perform data-domain data transmission with a network. Therefore, in this case, the encryption option transmission identity is set to 1, and the terminal selects an APN that can be used for establishing only an IMS bearer, to perform network attachment, so that only a voice service is performed but a data service is not performed.

In this embodiment of the present invention, an example in which the encryption option transmission identity is 1 when the terminal determines that the status of the data switch is the disabled state is used for description.

602. The terminal sends, to the MME, an attach request that carries the encryption option transmission identity.

The terminal sends, to the MME by using the eNodeB, the attach request that carries the encryption option transmission identity.

603. The MME performs authentication on the terminal.

The attach request sent by the terminal to the MME carries a GUTI (globally unique temporary identity) identity, and the MME performs authentication on the terminal according to the GUTI identity.

It should be noted that if the carried GUTI identity is allocated by an MME or an SGSN (serving GPRS support node) in an original network, the MME sends an authentication request to the MME or the SGSN in the original network, and the MME or the SGSN in the original network performs an authentication response, and sends an IMSI (international mobile subscriber identity) corresponding to the terminal to the MME. In this case, if the authentication of the MME or the SGSN in the original network fails, the MME directly sends an identity request to the terminal to obtain the IMSI. The original network is a network to which the terminal is attached before the terminal is attached to the network this time.

Further, if an attach request is not an integrity protection message, or integrity check fails, the MME executes an authentication and encryption procedure in a process of performing authentication and integrity check on the terminal. For example, the MME may check a mobility management identity. The mobility management identity needs to be obtained, and the terminal needs to provide the mobility management identity for the MME.

604. When determining that the encryption option transmission identity in the attach request is 1, the MME sends an encryption option request to the terminal, where the encryption option request is used to obtain, from the terminal, an IMS APN required for establishing a bearer in an attach procedure.

The MME obtains the encryption option transmission identity by using the attach request, and performs different processing according to different values indicated by the encryption option transmission identity. In this embodiment of the present invention, that the encryption option transmission identity is 1 indicates that the MME needs to obtain, from the terminal, the IMS APN required for establishing the bearer in the attach procedure. When determining that the encryption option transmission identity in the attach request is 1, the MME sends the encryption option request to the terminal. The encryption option request is used to obtain, from the terminal, the IMS APN required for establishing the bearer in the attach procedure.

605. The terminal returns the IMS APN, so that the MME establishes a voice bearer according to the IMS APN.

That the terminal sets the encryption option transmission identity to 1 when the data switch is in the disabled state in step 601 indicates that the IMS APN required for establishing the bearer in the attach procedure needs to be provided for the MME. Therefore, when the terminal receives the encryption option request sent by the MME, the terminal returns the IMS APN to the MME, so that the MME establishes the voice bearer according to the IMS APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, when a terminal is being attached to a network, a status of a data switch is first determined. When the data switch is disabled, it indicates that the terminal does not need to perform data-domain data transmission with the network. In this case, the terminal sets an encryption option transmission identity to a preset value, and sends, to an MME, an attach request that carries the encryption option transmission identity, and after receiving the attach request, the MME executes an attach procedure. During execution of the attach procedure, because the encryption option transmission identity is a first preset value, the MME needs to send an encryption option request to the terminal, and the terminal returns an IMS APN to the MME, so as to establish only an IMS bearer in the attach procedure. Therefore, no data bearer is established between the terminal and the network, so as to ensure that no data transmission is performed between the terminal and the network anymore, and avoid wasting data transmission resources and bringing an unnecessary loss to a user of the terminal.

In addition, it should be noted that when a terminal is being attached to a network, a data bearer and a voice bearer are established between the terminal and the network at the same time. The data bearer is used for performing data-domain data transmission between the terminal and the network, and the voice bearer is used for performing voice-domain data transmission between the terminal and the network. In the prior art, when a data switch is in a disabled state, a terminal does not send data to a network anymore, that is, not only controls the terminal not to send data in a data domain to the network anymore, but also enables the terminal not to send data in a voice domain to the network anymore. Therefore, the terminal cannot be attached to the network, and use of a voice service of the terminal is affected. In this embodiment of the present invention, when a terminal starts to be attached to a network, if a data switch is in a disabled state, only a voice bearer is established but a data bearer is not established between the terminal and the network in an attach procedure, the network can perform voice-domain data transmission with the terminal, and a voice service of the terminal can be normally used.

606. When determining that session information of the terminal exists on a network, the MME executes a session information deleting procedure.

When the MME determines that the session information of the terminal exists on the network, the MME sends a delete session request to the S-GW, the S-GW sends a delete session request to the P-GW, the P-GW sends a session termination procedure initiated by a PCEF, then the P-GW returns a delete session response to the S-GW, and the S-GW sends a delete session response to the MME.

607. The MME sends a location update request to the HSS.

608. The HSS responds to the MME with a location update acknowledgement.

In a process in which the HSS updates a location of the terminal, if the HSS has information about the MME or the SGSN in the original network, the HSS sends a location delete message to the MME or the SGSN in the original network, and after deleting location information, the MME or the SGSN in the original network sends a location delete acknowledgment to the HSS. If the MME or the SGSN in the original network still has the session information of the terminal, the MME or the SGSN in the original network sends a delete session request to a corresponding S-GW, and the S-GW corresponding to the MME or the SGSN in the original network sends a delete session request to a corresponding P-GW, so that the P-GW sends a session termination procedure initiated by a PCEF. After a session is deleted, the P-GW returns a delete session response to the S-GW, and the S-GW sends a delete session response to the MME or the SGSN in the original network.

609. The MME queries a P-GW and an S-GW that are corresponding to the IMS APN.

The MME queries, by using a DNS (domain name server), the P-GW corresponding to the IMS APN and queries, by using a TAI (tracking area identity), the S-GW corresponding to the IMS APN.

610. The MME, the S-GW, the P-GW, and the PCRF execute a session establishment procedure.

The MME first sends a create session request to the S-GW. The S-GW sends a create session request to the P-GW corresponding to the IMS APN sent by the MME. A PCEF of the P-GW initiates an IP-CAN session establishment procedure, and the PCRF responds. The P-GW sends a create session response to the S-GW. The S-GW sends a create session response to the MME.

611. The MME and the eNodeB execute a terminal attach procedure.

The MME sends, to the eNodeB, an initial context setup request that carries an attach accept message and user plane information of the S-GW that are sent to the terminal. The eNodeB sends an RRC (radio resource control) connection reconfiguration message to the terminal. The terminal responds to the eNodeB with an RRC connection reconfiguration complete message. The eNodeB sends, to the MME, an initial context setup response that carries user plane information of the eNodeB. The terminal sends, to the eNodeB, a direct transfer message that carries an attach complete message sent to the MME. The eNodeB sends the attach complete message to the MME.

It should be noted that the foregoing procedure is a process of performing network attachment when the data switch is disabled. After step 611 is performed, the terminal can perform a VoIMS voice service by using the network. When a user needs data transmission, that is, the data switch of the terminal is enabled, the terminal sends a data bearer establishment request to the MME to trigger the MME to execute a data bearer establishment procedure. After a data bearer is established, the terminal can use a data service. A specific process is described in steps 511 to 513, and details are not described herein again.

Figure 7:
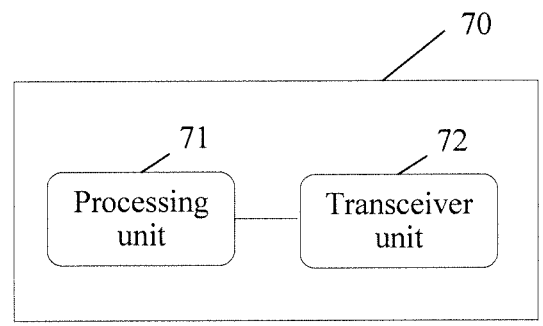
FIG. 7 is a schematic structural diagram of an apparatus according to another embodiment of the present invention.

Another embodiment of the present invention provides a data processing apparatus 70. As shown in FIG. 7, the apparatus 70 includes:

a processing unit 71, configured to detect a status of a data switch of a terminal, where the status includes a disabled state or an enabled state; and a transceiver unit 72, configured to send a public data network PDN disconnection request to a mobility management entity MME after the status of the data switch is changed from the enabled state to the disabled state, where the PDN disconnection request carries information about a data bearer corresponding to a data domain access point name APN, and the PDN disconnection request is used to trigger the MME to delete the data bearer corresponding to the APN.

Further, the transceiver unit 72 is further configured to send a PDN connection request to the MME after the status of the data switch is changed from the disabled state to the enabled state, where the PDN connection request carries a data-type APN, so that the MME establishes a data bearer according to the data-type APN.

Further, when the terminal is in an international roaming state, the data switch includes a data traffic switch and an international roaming switch; the processing unit 71 is further configured to detect at least one of a status of the data traffic switch or a status of the international roaming switch; and the transceiver unit 72 is configured to send the public data network PDN disconnection request to the mobility management entity MME when the status of the data traffic switch is changed from the enabled state to the disabled state or when the status of the international roaming switch is changed from the enabled state to the disabled state.

Further, the transceiver unit 72 is further configured to send the PDN connection request to the MME after the status of the data traffic switch is changed from the disabled state to the enabled state and after the status of the international roaming switch is changed from the disabled state to the enabled state.

Further, when the terminal is in a non-international roaming state, the data switch includes a data traffic switch; the processing unit 71 is further configured to detect a status of the data traffic switch; and the transceiver unit 72 is configured to send the public data network PDN disconnection request to the mobility management entity MME after the status of the data traffic switch is changed from the enabled state to the disabled state.

Further, the transceiver unit 72 is further configured to send the PDN connection request to the MME after the status of the data traffic switch is changed from the disabled state to the enabled state.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, an apparatus 70 detects a status of a data switch. When the data switch is changed from enabled to disabled, it indicates that a terminal does not need to perform data information transmission with a network. In this case, the apparatus 70 sends, to a mobility management entity MME, a PDN disconnection request that carries information about a data bearer corresponding to a data domain APN, so that after receiving the PDN disconnection request, the MME executes a data bearer deleting procedure. In this way, a channel for performing data transmission between the terminal and the network is deleted, so as to ensure that no data transmission is performed between the terminal and the network anymore, and avoid wasting data transmission resources and bringing an unnecessary loss to a user of the terminal.

Figure 8:
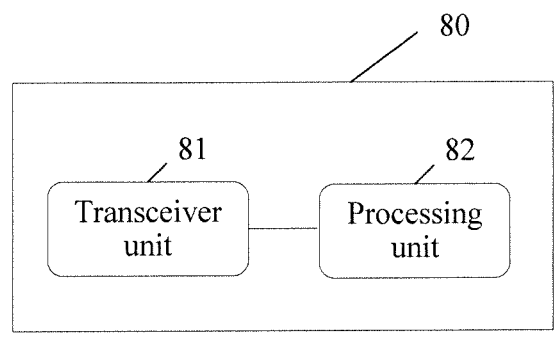
FIG. 8 is a schematic structural diagram of an apparatus according to another embodiment of the present invention.

Another embodiment of the present invention provides a data processing apparatus 80. As shown in FIG. 8, the apparatus 80 includes:

a transceiver unit 81, configured to receive a public data network PDN disconnection request sent by a terminal, where the PDN disconnection request carries information about a data bearer corresponding to a data domain access point name APN; and a processing unit 82, configured to delete, according to the PDN disconnection request, the data bearer corresponding to the APN.

Further, the transceiver unit 81 is further configured to receive a PDN connection request sent by the terminal, where the PDN connection request carries a data-type APN.

The processing unit 82 is further configured to establish a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, after a data switch of a terminal is changed from enabled to disabled, an apparatus 80 receives a PDN disconnection request, and then executes a data bearer deleting procedure according to the PDN disconnection request, to delete a data bearer corresponding to a data domain APN, that is, to delete a channel for performing data transmission between the terminal and a network, so as to ensure that no data-domain data transmission is performed between the terminal and the network anymore, and avoid wasting data transmission resources and bringing an unnecessary loss to a user of the terminal.

Figure 9:
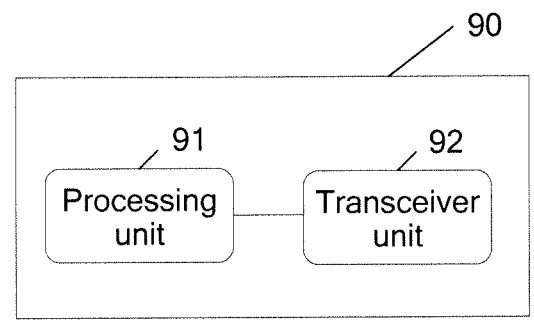
FIG. 9 is a schematic structural diagram of an apparatus according to another embodiment of the present invention.

Another embodiment of the present invention provides a data processing apparatus 90. As shown in FIG. 9, the apparatus 90 includes:

a processing unit 91, configured to: determine a status of a data switch, where the status includes a disabled state or an enabled state; when the data switch is in the disabled state, set, to a first preset value, an encryption option transmission identity carried in an attach request, where the encryption option transmission identity that is set to the first preset value is used to indicate that the data switch is in the disabled state; and set the encryption option transmission identity to a second preset value when the data switch is in the enabled state, where the encryption option transmission identity that is set to the second preset value is used to indicate that the data switch is in the enabled state; and a transceiver unit 92, configured to: send the attach request to a mobility management entity MME; receive an encryption option request sent by the MME, where the encryption option request is sent to the terminal when the MME detects that the encryption option transmission identity is the first preset value, and the encryption option request is used to obtain, from the terminal, an Internet Protocol IP multimedia subsystem IMS access point name APN required for establishing a bearer in an attach procedure; and send the IMS APN to the MME, so that the MME establishes a voice bearer according to the IMS APN.

Further, when the terminal is in an international roaming state, the data switch includes a data traffic switch and an international roaming switch; and the processing unit 91 is further configured to: determine at least one of a status of the data traffic switch or a status of the international roaming switch; when the data traffic switch is in the disabled state or when the international roaming switch is in the disabled state, set, to the first preset value, the encryption option transmission identity carried in the attach request; and set the encryption option transmission identity to the second preset value when the data traffic switch is in the enabled state and when the international roaming switch is in the enabled state.

Further, when the terminal is in a non-international roaming state, the data switch includes a data traffic switch; and the processing unit 91 is further configured to: determine a status of the data traffic switch; when the data traffic switch is in the disabled state, set, to the first preset value, the encryption option transmission identity carried in the attach request; and set the encryption option transmission identity to the second preset value when the data traffic switch is in the enabled state.

Further, the transceiver unit 92 is further configured to send a PDN connection request to the MME, where the PDN connection request carries a data-type APN, so that the MME establishes a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, an apparatus 90 first determines whether a data switch is in a disabled state; when the data switch is in the disabled state, sets, to a first preset value that is used to indicate that the data switch is in the disabled state, an encryption option transmission identity carried in an attach request; when the data switch is in an enabled state, sets the encryption option transmission identity to a second preset value that is used to indicate that the data switch is in the enabled state; and then sends the attach request to an MME. After receiving an encryption option request sent by the MME, the apparatus 90 sends an IMS APN to the MME, so that the MME establishes a voice bearer according to the received IMS APN. In this way, when the data switch is in the disabled state, the terminal sets, to the first preset value that is used to indicate that the data switch is in the disabled state, the encryption option transmission identity carried in the attach request, to indicate that an APN required for establishing a bearer in this attach procedure is an IMS APN. After obtaining the IMS APN from the terminal, the MME establishes the voice bearer. Because the APN required for establishing the bearer is the IMS APN, and the MME cannot establish a data bearer by using the IMS APN, a channel for performing data transmission between the terminal and a network cannot be established, so as to ensure that no data-domain data transmission is performed between the terminal and the network, and avoid wasting data transmission resources and bringing an unnecessary loss to a user of the terminal.

Figure 10:
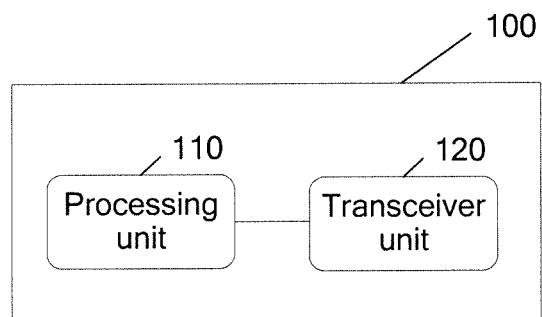
FIG. 10 is a schematic structural diagram of an apparatus according to another embodiment of the present invention.

Another embodiment of the present invention provides a data processing apparatus 100. As shown in FIG. 10, the apparatus 100 includes:

a transceiver unit 120, configured to: receive an attach request sent by a terminal, where the attach request carries an encryption option transmission identity and is used to trigger the MME to execute an attach procedure, the encryption option transmission identity is a first preset value when a data switch of the terminal is in a disabled state, and the encryption option transmission identity is a second preset value when the data switch of the terminal is in an enabled state; send an encryption option request to the terminal when the MME detects that the encryption option transmission identity is the first preset value, where the encryption option request is used to obtain, from the terminal, an Internet Protocol IP multimedia subsystem IMS access point name APN required for establishing a bearer in the attach procedure; and receive the IMS APN sent by the terminal; and a processing unit 110, configured to establish a voice bearer according to the IMS APN.

Further, the transceiver unit 120 is further configured to receive a PDN connection request sent by the terminal, where the PDN connection request carries a data-type APN.

The processing unit 110 is further configured to establish a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, after receiving an attach request that carries an encryption option transmission identity and is sent by a terminal, an apparatus 100 detects a value of the encryption option transmission identity; and sends an encryption option request to the terminal when the encryption option transmission identity is a first preset value, so as to obtain, from the terminal, an IMS APN required for establishing a bearer in an attach procedure. After receiving the IMS APN sent by the terminal, the MME establishes a voice bearer according to the received IMS APN. In this way, after the encryption option transmission identity carried in the attach request is set to the first preset value that is used to indicate that a data switch is in a disabled state, the apparatus 100 obtains the IMS APN from the terminal and establishes the voice bearer. Because an APN required for establishing a bearer is an IMS APN, and the apparatus 100 cannot establish a data bearer by using the IMS APN, a channel for performing data transmission between the terminal and a network cannot be established, so as to ensure that no data-domain data transmission is performed between the terminal and the network, and avoid wasting data transmission resources and bringing an unnecessary loss to a user of the terminal.

Figure 11:
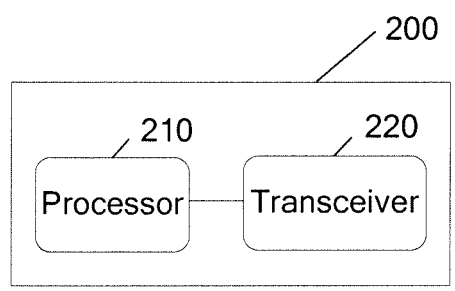
FIG. 11 is a schematic structural diagram of a terminal according to another embodiment of the present invention.

Another embodiment of the present invention provides a data processing terminal 200. As shown in FIG. 11, the terminal 200 includes:

a processor 210, configured to detect a status of a data switch of the terminal, where the status includes a disabled state or an enabled state; and a transceiver 220, configured to send a public data network PDN disconnection request to a mobility management entity MME after the status of the data switch is changed from the enabled state to the disabled state, where the PDN disconnection request carries information about a data bearer corresponding to a data domain access point name APN, and the PDN disconnection request is used to trigger the MME to delete the data bearer corresponding to the APN.

Further, the transceiver 220 is further configured to send a PDN connection request to the MME after the status of the data switch is changed from the disabled state to the enabled state, where the PDN connection request carries a data-type APN, so that the MME establishes a data bearer according to the data-type APN.

Further, when the terminal is in an international roaming state, the data switch includes a data traffic switch and an international roaming switch; the processor 210 is further configured to detect at least one of a status of the data traffic switch or a status of the international roaming switch; and the transceiver 220 is configured to send the public data network PDN disconnection request to the mobility management entity MME after the status of the data traffic switch is changed from the enabled state to the disabled state or after the status of the international roaming switch is changed from the enabled state to the disabled state.

Further, the transceiver 220 is configured to send the PDN connection request to the MME after the status of the data traffic switch is changed from the disabled state to the enabled state and after the status of the international roaming switch is changed from the disabled state to the enabled state.

Further, when the terminal is in a non-international roaming state, the data switch includes a data traffic switch; the processor 210 is further configured to detect a status of the data traffic switch; and the transceiver 220 is configured to send the public data network PDN disconnection request to the mobility management entity MME after the status of the data traffic switch is changed from the enabled state to the disabled state.

Further, the transceiver 220 is configured to send the PDN connection request to the MME after the status of the data traffic switch is changed from the disabled state to the enabled state.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, a terminal 200 detects a status of a data switch. After the data switch is changed from enabled to disabled, it indicates that the terminal 200 does not need to perform data information transmission with a network. In this case, the terminal sends, to a mobility management entity MME, a PDN disconnection request that carries information about a data bearer corresponding to a data domain APN, so that after receiving the PDN disconnection request, the MME executes a data bearer deleting procedure. In this way, a channel for performing data transmission between the terminal 200 and the network is deleted, so as to ensure that no data transmission is performed between the terminal and the network anymore, and avoid wasting data transmission resources and bringing an unnecessary loss to a user of the terminal 200.

Figure 12:
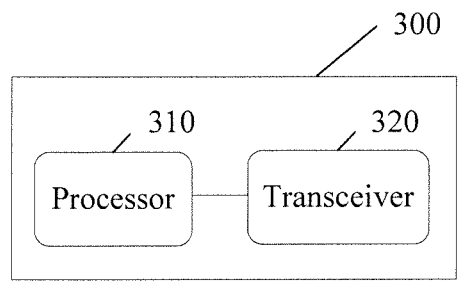
FIG. 12 is a schematic structural diagram of a mobility management entity according to another embodiment of the present invention.

Another embodiment of the present invention provides a data processing mobility management entity 300. As shown in FIG. 12, the mobility management entity 300 includes:

a transceiver 320, configured to receive a public data network PDN disconnection request sent by a terminal, where the PDN disconnection request carries information about a data bearer corresponding to a data domain access point name APN; and a processor 310, configured to delete, according to the PDN disconnection request, the data bearer corresponding to the APN.

Further, the transceiver 320 is further configured to receive a PDN connection request sent by the terminal, where the PDN connection request carries a data-type APN; and the processor is further configured to establish a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, after a data switch of a terminal is changed from enabled to disabled, an MME 300 receives a PDN disconnection request, and then executes a data bearer deleting procedure according to the PDN disconnection request, to delete a data bearer corresponding to a data domain APN, that is, to delete a channel for performing data transmission between the terminal and a network, so as to ensure that no data-domain data transmission is performed between the terminal and the network anymore, and avoid wasting data transmission resources and bringing an unnecessary loss to a user of the terminal.

Figure 13:
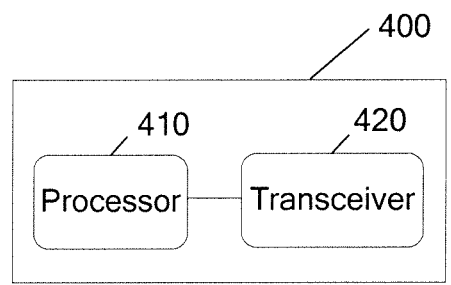
FIG. 13 is a schematic structural diagram of a terminal according to another embodiment of the present invention.

Another embodiment of the present invention provides a data processing terminal 400. As shown in FIG. 13, the terminal 400 includes:

a processor 410, configured to: determine a status of a data switch, where the status includes a disabled state or an enabled state; when the data switch is in the disabled state, set, to a first preset value, an encryption option transmission identity carried in an attach request, where the encryption option transmission identity that is set to the first preset value is used to indicate that the data switch is in the disabled state; and set the encryption option transmission identity to a second preset value when the data switch is in the enabled state, where the encryption option transmission identity that is set to the second preset value is used to indicate that the data switch is in the enabled state; and a transceiver 420, configured to: send the attach request to a mobility management entity MME; receive an encryption option request sent by the MME, where the encryption option request is sent to the terminal when the MME detects that the encryption option transmission identity is the first preset value, and the encryption option request is used to obtain, from the terminal, an Internet Protocol IP multimedia subsystem IMS access point name APN required for establishing a bearer in an attach procedure; and send the IMS APN to the MME, so that the MME establishes a voice bearer according to the IMS APN.

Further, when the terminal is in an international roaming state, the data switch includes a data traffic switch and an international roaming switch; and the processor 410 is further configured to: determine at least one of a status of the data traffic switch or a status of the international roaming switch; when the data traffic switch is in the disabled state or when the international roaming switch is in the disabled state, set, to the first preset value, the encryption option transmission identity carried in the attach request; and set the encryption option transmission identity to the second preset value when the data traffic switch is in the enabled state and when the international roaming switch is in the enabled state.

Further, when the terminal is in a non-international roaming state, the data switch includes a data traffic switch; and the processor 410 is further configured to: determine a status of the data traffic switch; when the data traffic switch is in the disabled state, set, to the first preset value, the encryption option transmission identity carried in the attach request; and set the encryption option transmission identity to the second preset value when the data traffic switch is in the enabled state.

Further, the transceiver 420 is further configured to send a PDN connection request to the MME, where the PDN connection request carries a data-type APN, so that the MME establishes a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, a terminal 400 first determines whether a data switch is in a disabled state; when the data switch is in the disabled state, sets, to a first preset value that is used to indicate that the data switch is in the disabled state, an encryption option transmission identity carried in an attach request; when the data switch is in an enabled state, sets the encryption option transmission identity to a second preset value that is used to indicate that the data switch is in the enabled state; and then sends the attach request to an MME. After receiving an encryption option request sent by the MME, the terminal 400 sends an IMS APN to the MME, so that the MME establishes a voice bearer according to the received IMS APN. In this way, when the data switch is in the disabled state, the terminal 400 sets, to the first preset value that is used to indicate that the data switch is in the disabled state, the encryption option transmission identity carried in the attach request, to indicate that an APN required for establishing a bearer in this attach procedure is an IMS APN. After obtaining the IMS APN from the terminal 400, the MME establishes the voice bearer. Because the APN required for establishing the bearer is the IMS APN, and the MME cannot establish a data bearer by using the IMS APN, a channel for performing data transmission between the terminal 400 and a network cannot be established, so as to ensure that no data-domain data transmission is performed between the terminal and the network, and avoid wasting data transmission resources and bringing an unnecessary loss to a user of the terminal 400.

Figure 14:
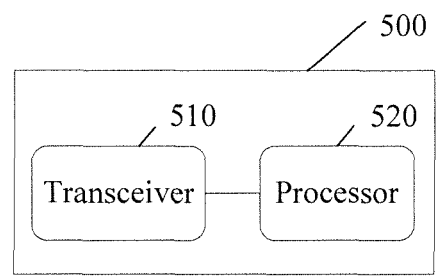
FIG. 14 is a schematic structural diagram of a mobility management entity according to another embodiment of the present invention.

Another embodiment of the present invention provides a data processing mobility management entity 500. As shown in FIG. 14, the mobility management entity 500 includes:

a transceiver 510, configured to: receive an attach request sent by a terminal, where the attach request carries an encryption option transmission identity, the encryption option transmission identity is a first preset value when a data switch of the terminal is in a disabled state, and the encryption option transmission identity is a second preset value when the data switch of the terminal is in an enabled state; send an encryption option request to the terminal when the MME detects that the encryption option transmission identity is the first preset value, where the encryption option request is used to obtain, from the terminal, an Internet Protocol IP multimedia subsystem IMS access point name APN required for establishing a bearer in an attach procedure; and receive the IMS APN sent by the terminal; and a processor 520, configured to establish a voice bearer according to the IMS APN.

Further, the transceiver 510 is further configured to receive a PDN connection request sent by the terminal, where the PDN connection request carries a data-type APN.

The processor 520 is further configured to establish a data bearer according to the data-type APN.

In the prior art, after a data switch or a roaming data switch is disabled, a terminal can only enable the terminal not to send data to a network, but a data bearer between the terminal and the network still exists. The terminal receives a data packet that does not need to be received, and a corresponding charge is calculated, which not only wastes data transmission resources but also brings an economic loss to a user. Compared with the prior art, in the present invention, after receiving an attach request that carries an encryption option transmission identity and is sent by a terminal, an MME 500 detects a value of the encryption option transmission identity; and sends an encryption option request to the terminal when the encryption option transmission identity is a first preset value, so as to obtain, from the terminal, an IMS APN required for establishing a bearer in an attach procedure. After receiving the IMS APN sent by the terminal, the MME establishes a voice bearer according to the received IMS APN. In this way, after the encryption option transmission identity carried in the attach request is set to the first preset value that is used to indicate that a data switch is in a disabled state, the MME 500 obtains the IMS APN from the terminal and establishes the voice bearer. Because an APN required for establishing a bearer is an IMS APN, and the MME 500 cannot establish a data bearer by using the IMS APN, a channel for performing data transmission between the terminal and a network cannot be established, so as to ensure that no data-domain data transmission is performed between the terminal and the network, and avoid wasting data transmission resources and bringing an unnecessary loss to a user of the terminal.

Figure 15:
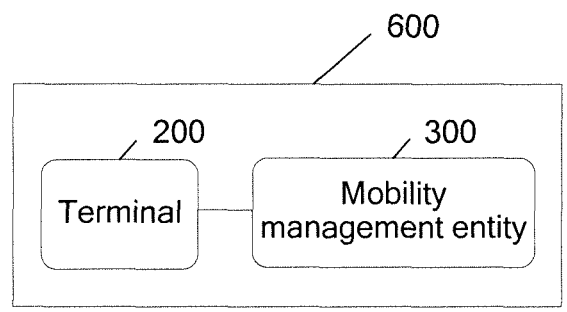
FIG. 15 is a schematic structural diagram of a system according to another embodiment of the present invention.

Another embodiment of the present invention provides a data processing system 600. As shown in FIG. 15, the system 600 includes the terminal 200 and the mobility management entity 300.

Figure 16:
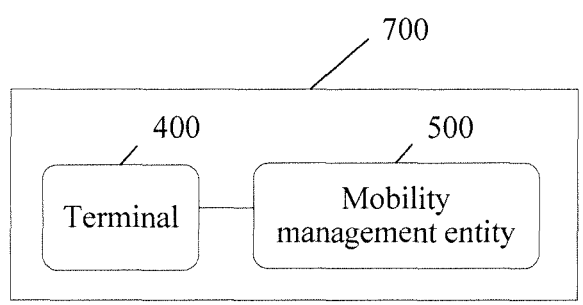
FIG. 16 is a schematic structural diagram of a system according to another embodiment of the present invention.

Another embodiment of the present invention provides a data processing system 700. As shown in FIG. 16, the system 700 includes the terminal 400 and the mobility management entity 500.

The data processing apparatuses provided in the embodiments of the present invention may implement the foregoing provided method embodiments. For specific function implementation, refer to descriptions in the method embodiments. Details are not described herein again. The terminal data processing method, apparatus, terminal, mobility management entity, and system provided in the embodiments of the present invention may be applied to a system including a terminal and an MME. This is not limited herein.

The embodiments in this specification are all described in a progressive manner, for same or similar parts in the embodiments, reference may be made to these embodiments, and each embodiment focuses on a difference from other embodiments.

Especially, a device embodiment is basically similar to a method embodiment, and therefore is described briefly; for related parts, refer to partial descriptions in the method embodiment.

Persons of ordinary skill in the art may understand that all or some of the processes of the methods in the embodiments may be implemented by a computer program instructing relevant hardware. The program may be stored in a computer readable storage medium. When the program runs, the procedures of the methods in the embodiments are executed. The foregoing storage medium may be a magnetic disk, an optical disc, a read-only memory (Read-Only Memory, ROM), a random access memory (Random Access Memory, RAM), or the like.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A data processing method, comprising:
   determining, by a terminal, a status of a data switch of the terminal to control establishment of a data bearer between the terminal and a network to establish a data communication session, wherein the status of the data switch of the terminal comprises a disabled state or an enabled state for the data bearer;
   setting, by the terminal, to a first preset value, when the data switch of the terminal is in the disabled state, an encryption option transmission identity carried in an attach request, wherein the encryption option transmission identity that is set to the first preset value is used to indicate that the data switch of the terminal is in the disabled state;
   setting the encryption option transmission identity to a second preset value when the data switch of the terminal is in the enabled state, wherein the encryption option transmission identity that is set to the second preset value is used to indicate that the data switch of the terminal is in the enabled state;
   sending, by the terminal, the attach request to a mobility management entity (MME) to cause the MME to control establishment of the data bearer between the terminal and the network according to the first preset value or the second preset value of the encryption option transmission identity;
   receiving, by the terminal, an encryption option request sent by the MME to establish a voice bearer, wherein the encryption option request of the MME is sent to the terminal when the MME detects that the encryption option transmission identity is the first preset value to indicate that the data switch of the terminal is in the disabled state to cause the MME to, execute a data bearer deleting procedure through a data bearer delete command, and a delete request to be processed between the MME and the terminal, to delete a channel used to perform the data communication session, and indicate to obtain an Internet Protocol (IP) multimedia subsystem (IMS) access point name (APN) to establish the voice bearer, the encryption option request of the MME used to obtain, from the terminal, the IP IMS APN required for establishing the voice bearer in an attach procedure; and
   sending, by the terminal, the IMS APN to the MME.

2. The method according to claim 1, wherein when the terminal is in an international roaming state, the data switch of the terminal comprises a data traffic switch and an international roaming switch;
   the determining, by a terminal, a status of a data switch of the terminal comprises:
      determining, by the terminal, at least one of a status of the data traffic switch or a status of the international roaming switch;
   the setting, by the terminal to a first preset value when the data switch is in the disabled state, an encryption option transmission identity carried in an attach request comprises:
      when the data traffic switch is in the disabled state or when the international roaming switch is in the disabled state, setting, by the terminal to the first preset value, the encryption option transmission identity carried in the attach request; and
   the setting the encryption option transmission identity to a second preset value when the data switch is in the enabled state comprises:
      setting the encryption option transmission identity to the second preset value when the data traffic switch is in the enabled state and when the international roaming switch is in the enabled state.

3. A data processing method, comprising:
   receiving, by a mobility management entity (MME), an attach request sent by a terminal for a data bearer between the terminal and a network, wherein the attach request carries an encryption option transmission identity;
   determining, by the MME, that a data switch of the terminal is in a disabled state according to the value of the encryption option transmission identity in the attach request;
   sending, by the MME, an encryption option request to the terminal to establish a voice bearer, wherein the encryption option request is used to obtain, from the terminal, an Internet Protocol (IP) multimedia subsystem (IMS) access point name (APN) required for establishing the voice bearer in an attach procedure, when the MME detects that the value of the encryption option transmission identity indicates that the data switch is in the disabled state to cause the MME to, execute a data bearer deleting procedure through a data bearer delete command, and a delete request to be processed between the MME and the terminal, to delete a channel used to perform a data communication session, and indicate to obtain the IP IMS APN to establish the voice bearer;

receiving, by the MME, the IMS APN sent by the terminal; and establishing, by the MME, the voice bearer according to the IMS APN.

4. A data processing apparatus, comprising:
a processor, configured to:
determine a status of a data switch of the data processing apparatus to control establishment of a data bearer between the data processing apparatus and a network to establish a data communication session, wherein the status of the data switch comprises a disabled state or an enabled state for the data bearer;
when the data switch is in the disabled state, set, to a first preset value, an encryption option transmission identity carried in an attach request, wherein the encryption option transmission identity that is set to the first preset value is used to indicate that the data switch is in the disabled state; and
set the encryption option transmission identity to a second preset value when the data switch is in the enabled state, wherein the encryption option transmission identity that is set to the second preset value is used to indicate that the data switch is in the enabled state; and a transceiver, configured to:
send the attach request to a mobility management entity (MME) to cause the MME to control establishment of the data bearer between the data processing apparatus and the network according to the first preset value or the second preset value of the encryption option transmission identity;
receive an encryption option request sent by the MME to establish a voice bearer, wherein the encryption option request of the MME is sent to the terminal when the MME detects that the encryption option transmission identity is the first preset value to indicate that the data switch is in the disabled state to cause the MME to, execute a data bearer deleting procedure through a data bearer delete command, and a delete request to be processed between the MME and the terminal, to delete a channel used to perform the data communication session, and indicate to obtain an Internet Protocol (IP) multimedia subsystem (IMS) access point name (APN) to establish the voice bearer, the encryption option request of the MME used to obtain, from the data processing apparatus the IP IMS APN required for establishing a voice bearer in an attach procedure; and
send the IMS APN to the MME.

5. The apparatus according to claim 4, wherein when the terminal is in an international roaming state, the data switch comprises a data traffic switch and an international roaming switch;

the processor is further configured to:
determine at least one of a status of the data traffic switch or a status of the international roaming switch;
when the data traffic switch is in the disabled state or when the international roaming switch is in the disabled state, set, to the first preset value, the encryption option transmission identity carried in the attach request; and
set the encryption option transmission identity to the second preset value when the data traffic switch is in the enabled state and when the international roaming switch is in the enabled state.

6. A data processing apparatus, comprising:
a non-transitory computer readable storage medium to store program(s), and
computer hardware configured to implement, including configured by the program(s) to implement functions of a mobility management unit (MME) to:
receive an attach request sent by a terminal for a data bearer between the terminal and a network, wherein the attach request carries an encryption option transmission identity used to trigger a mobility management entity (MME) to execute an attach procedure, the encryption option transmission identity is a first preset value when a data switch of the terminal is in a disabled state, and the encryption option transmission identity is a second preset value when the data switch of the terminal is in an enabled state;
send an encryption option request to the terminal to establish a voice bearer, when the MME detects that the encryption option transmission identity is the first preset value to indicate that the data switch is in the disabled state to cause the MME to, execute a data bearer deleting procedure through a data bearer delete command, and a delete request to be processed between the MME and the terminal, to delete a channel used to perform the data communication session, and indicate to obtain the IP IMS APN to establish the voice bearer, the encryption option request of the MME used to obtain, from the terminal, the IP IMS APN required for establishing the voice bearer in an attach procedure;
receive the IMS APN sent by the terminal; and
establish the voice bearer according to the IMS APN.

7. The apparatus according to claim 6, wherein the computer hardware is further configured to receive a public data network (PDN) connection request sent by the terminal, wherein the PDN connection request carries a data-type APN; and
establish a data bearer according to the data-type APN.

8. A terminal, comprising:
a processor, configured to:
determine a status of a data switch of the terminal to control establishment of a data bearer between the terminal and a network to establish a data communication session, wherein the status of the data switch comprises a disabled state or an enabled state for the data bearer;
when the data switch is in the disabled state, set, to a first preset value, an encryption option transmission identity carried in an attach request, wherein the encryption option transmission identity that is set to the first preset value is used to indicate that the data switch is in the disabled state;
set the encryption option transmission identity to a second preset value when the data switch is in the enabled state, wherein the encryption option transmission identity that is set to the second preset value is used to indicate that the data switch is in the enabled state; and
send the attach request to a mobility management entity (MME) to cause the MME to control establishment of the data bearer between the terminal and the network according to the first preset value or the second preset value of the encryption option transmission identity;

receive an encryption option request sent by the MME to establish a voice bearer, wherein the encryption option request of the MME is sent to the terminal when the MME detects that the encryption option transmission identity is the first preset value to indicate that the data switch is in the disabled state to cause the MME to, execute a data bearer deleting procedure through a data bearer delete command, and a delete request to be processed between the MME and the terminal, to delete a channel used to perform the data communication session, and indicate to obtain an Internet Protocol (IP) multimedia subsystem (IMS) access point name (APN) to establish the voice bearer, the encryption option request of the MME used to obtain, from the terminal, the IP IMS APN required for establishing the voice bearer in an attach procedure; and send the IMS APN to the MME, so that the MME establishes the voice bearer according to the IMS APN.

9. The terminal according to claim 8, wherein when the terminal is in an international roaming state, the data switch comprises a data traffic switch and an international roaming switch; and the processor is further configured to:

determine at least one of a status of the data traffic switch or a status of the international roaming switch;

when the data traffic switch is in the disabled state or when the international roaming switch is in the disabled state, set, to the first preset value, the encryption option transmission identity carried in the attach request; and set the encryption option transmission identity to the second preset value when the data traffic switch is in the enabled state and when the international roaming switch is in the enabled state.

10. The terminal according to claim 8, wherein when the terminal is in a non-international roaming state, the data switch comprises a data traffic switch; and the processor is further configured to:

determine a status of the data traffic switch;

when the data traffic switch is in the disabled state, set, to the first preset value, the encryption option transmission identity carried in the attach request; and set the encryption option transmission identity to the second preset value when the data traffic switch is in the enabled state.

11. The terminal according to claim 8, wherein the processor is further configured to send a public data network (PDN) connection request to the MME, wherein the PDN connection request carries a data-type APN, so that the MME establishes a data bearer according to the data-type APN.

12. A data processing mobility management entity (MME), comprising:

a transceiver, configured to:

receive an attach request sent by a terminal for a data bearer between the terminal and a network, wherein the attach request carries an encryption option transmission identity, the encryption option transmission identity is a first preset value when a data switch of the terminal is in a disabled state, and the encryption option transmission identity is a second preset value when the data switch of the terminal is in an enabled state;

send an encryption option request to the terminal to establish a voice bearer, when the MME detects that the encryption option transmission identity is the first preset value to indicate that the data switch is in the disabled state to cause the MME to, execute a data bearer deleting procedure through a data bearer delete command, and a delete request to be processed between the MME and the terminal, to delete a channel used to perform the data communication session, and indicate to obtain the IP IMS APN to establish the voice bearer, wherein the encryption option request of the MME is used to obtain, from the terminal, the IP IMS APN required for establishing the voice bearer in an attach procedure; and receive the IMS APN sent by the terminal; and a processor, configured to establish the voice bearer according to the IMS APN.

13. The MME according to claim 12, wherein the transceiver is further configured to receive a public data network (PDN) connection request sent by the terminal, wherein the PDN connection request carries a data-type APN; and the processor is further configured to establish a data bearer according to the data-type APN.

* * * * *